(12) United States Patent
Pinto et al.

(10) Patent No.: US 12,115,612 B2
(45) Date of Patent: Oct. 15, 2024

(54) METHOD AND SYSTEM FOR CUEING A USER OF A TOOL

(71) Applicant: GRYP Technologies Inc., Waterloo (CA)

(72) Inventors: Brendan L. Pinto, Waterloo (CA); Cederick Landry, Waterloo (CA); Daniel P. Loewen, Waterloo (CA); Harish R. Rao, Waterloo (CA)

(73) Assignee: GRYP Technologies Inc., Waterloo (CA)

( * ) Notice: Subject to any disclaimer, the term of this patent is extended or adjusted under 35 U.S.C. 154(b) by 9 days.

(21) Appl. No.: 17/749,248

(22) Filed: May 20, 2022

(65) Prior Publication Data

US 2022/0371144 A1   Nov. 24, 2022

Related U.S. Application Data

(60) Provisional application No. 63/191,456, filed on May 21, 2021.

(51) Int. Cl.
| | | |
|---|---|---|
| *B23D 59/00* | (2006.01) | |
| *B23Q 17/00* | (2006.01) | |
| *B25B 21/00* | (2006.01) | |
| *B25F 5/00* | (2006.01) | |

(52) U.S. Cl.
CPC ............ *B23Q 17/007* (2013.01); *B25B 21/00* (2013.01); *B25F 5/00* (2013.01)

(58) Field of Classification Search
CPC .................................................... B23D 59/001
See application file for complete search history.

(56) References Cited

U.S. PATENT DOCUMENTS

| | | | |
|---|---|---|---|
| 5,221,088 A | 6/1993 | McTeigue et al. | |
| 5,401,928 A * | 3/1995 | Kelley | H01H 13/506 |
| | | | 200/522 |
| 5,449,002 A | 9/1995 | Goldman | |

(Continued)

FOREIGN PATENT DOCUMENTS

| | | |
|---|---|---|
| CA | 2352768 A1 | 6/1999 |
| CA | 2818146 A1 | 10/2014 |

(Continued)

OTHER PUBLICATIONS

Gust, Peter, et al., Developing of a System for Measuring and Evaluating the Hand Stress in Relation to the Strain Index, Advances in Ergonomics in Design, 2016, pp. 455-463, Advances in Intelligent Systems and Computing 485, Springer International Publishing Switzerland.

(Continued)

*Primary Examiner* — Thanh K Truong
*Assistant Examiner* — Patrick B Fry

(57) ABSTRACT

A method of providing cueing signals to a user of a tool. Engagement sensors are positioned, for obtaining engagement data regarding the user's engagement with the tool. The engagement data is compared to a preselected acceptable range of engagement data. If the engagement data is outside the preselected acceptable range of engagement data, then an alert signal is transmitted to an alert device. Upon receipt of the alert signal, the alert device generates a cueing alert signal to indicate that the engagement data is outside the preselected acceptable range.

10 Claims, 16 Drawing Sheets

(56) References Cited

U.S. PATENT DOCUMENTS

| | | | |
|---|---|---|---|
| 5,577,510 A | 11/1996 | Chittum et al. | |
| 5,745,376 A | 4/1998 | Barker et al. | |
| 5,775,332 A | 7/1998 | Goldman | |
| 6,402,708 B1 | 6/2002 | Sitte | |
| 6,487,906 B1 | 12/2002 | Hock | |
| 6,536,536 B1 * | 3/2003 | Gass | B25F 5/021 173/171 |
| 7,355,519 B2 | 4/2008 | Grold et al. | |
| 7,526,954 B2 | 5/2009 | Haselhurst et al. | |
| 7,845,225 B2 | 12/2010 | Ridenour et al. | |
| 8,033,916 B2 | 10/2011 | Caldwell et al. | |
| 8,449,410 B1 | 5/2013 | Kaufman | |
| 9,192,335 B2 | 11/2015 | Linderman | |
| 9,212,883 B2 | 12/2015 | Emtman et al. | |
| 9,526,451 B1 | 12/2016 | Berme | |
| 9,562,818 B1 | 2/2017 | Adamski et al. | |
| 9,772,684 B2 | 9/2017 | Shi | |
| 9,808,208 B1 | 11/2017 | Erman | |
| 9,950,237 B2 | 4/2018 | Kline et al. | |
| 10,019,078 B2 | 7/2018 | Kim et al. | |
| 10,126,832 B2 | 11/2018 | Noorzai et al. | |
| 10,238,166 B2 | 3/2019 | Rosenbaum | |
| 10,279,200 B2 | 5/2019 | Hyde et al. | |
| 10,383,550 B2 | 8/2019 | Hyde et al. | |
| 10,649,549 B2 | 5/2020 | Kim et al. | |
| 11,508,018 B2 * | 11/2022 | Yoshimoto | G06F 1/163 |
| 11,533,956 B2 * | 12/2022 | Tanaka | G08B 7/06 |
| 11,705,721 B2 * | 7/2023 | Merget | B25F 5/00 310/50 |
| 2003/0054327 A1 | 3/2003 | Evensen | |
| 2014/0364771 A1 | 12/2014 | Pitts et al. | |
| 2017/0086519 A1 | 3/2017 | Vigano' et al. | |
| 2017/0265784 A1 | 9/2017 | Santello | |
| 2017/0311876 A1 | 11/2017 | Lu et al. | |
| 2019/0021669 A1 | 1/2019 | Apoorva et al. | |
| 2020/0030938 A1 * | 1/2020 | Knudson | B24B 49/14 |
| 2020/0282501 A1 * | 9/2020 | Thompson | B25F 5/00 |
| 2021/0056646 A1 * | 2/2021 | Yoshimoto | G06Q 50/04 |
| 2021/0283759 A1 * | 9/2021 | Merget | H02K 7/003 |
| 2022/0001462 A1 * | 1/2022 | Sunabe | B23B 45/02 |
| 2022/0388081 A1 * | 12/2022 | Larsén | B27B 17/00 |

FOREIGN PATENT DOCUMENTS

| | | |
|---|---|---|
| WO | WO9851451 A2 | 11/1998 |
| WO | WO2016157217 A2 | 10/2016 |
| WO | WO2017015655 A1 | 1/2017 |
| WO | WO2018226786 A1 | 12/2018 |
| WO | WO2020242938 A1 | 12/2020 |

OTHER PUBLICATIONS

Mcgorry, Raymond W., A system for the measurement of grip forces and applied moments during hand tool use, Applied Ergonomics, Sep. 9, 2000, pp. 271-279, issue 32, Elsevier, Hopkinton, MA, USA.

Mcgorry, Raymond W., et al., The Effect of Force Distribution and Magnitude at the Hand-Tool Interface on the Accuracy of Grip Force Estimates, Journal of Occupational Rehabilitation, Dec. 2004, pp. 255-266, vol. 14, No. 4, Springer Science + Business Media, Inc.

Nicholas, Jon W., et al., Quantification of hand grasp force using a pressure mapping system, 2012, Work 41, pp. 605-612, IOS Press, Ann Arbor, MI, USA.

Rossi, Jeremy, et al., Characterisation of forces exerted by the entire hand during the power grip: effect of the handle diameter, Ergonomics, Mar. 29, 2012, pp. 682-692, vol. 55, No. 6, Taylor & Francis Group, Marseille, France.

Loewen, Daniel Philip, Design and Evaluation of Grasp Assistive Devices in an Industrial Environment, Dec. 6, 2020, pp. 1-90, Waterloo, Ontario, Canada.

Landry, Cederick, et al., Isolating In-Situ Grip and Push Force Distribution from Hand-Handle Contact Pressure with an Industrial Electric Nutrunner, Sensors, Dec. 4, 2021, pp. 1-14, vol. 21, MDPI, Basel, Switzerland.

* cited by examiner

METHOD AND SYSTEM FOR CUEING A USER OF A TOOL

CROSS-REFERENCE TO RELATED APPLICATION

This application claims the benefit of U.S. Provisional Patent Application No. 63/191,456, filed on May 21, 2021, the entirety of which is hereby incorporated herein by reference.

FIELD OF THE INVENTION

The present invention is a system and a method for cueing a user to mitigate the user's improper use of a tool.

BACKGROUND OF THE INVENTION

Upper extremity repetitive strain or cumulative trauma injuries of the hand and wrist such as tendonitis, tenosynovitis, and carpal tunnel syndrome result from overuse of muscles with insufficient time to repair the incurred damage to the tendons, tendon sheath, or increased carpal tunnel pressure. Primary contributing workplace factors are applied force, task or activity repetition, and the relative position between the hand and wrist or forearm. Activities designed for optimum ergonomics minimize task or activity repetition, and the relative position between the hand and forearm may be visually documented, while the amount of applied force during a task or activity typically is not quantified.

There is evidence suggesting that workers frequently apply more force than required. For instance, experienced and inexperienced assembly line workers exhibit a large variation in applied grip force from one day to the next and from one person to the next. Studies have shown a 3x mean difference in force applied between minimum and maximum and a 5x difference in absolute range of force applied, while still completing the task or activity safely and efficiently. This suggests that experienced and inexperienced assembly line workers are not aware of a) the minimum amount of applied force required for a task or activity and b) the amount of force they are applying for the task or activity.

As is well known in the art, in addition to the pain and suffering to which some workers are subjected due to repetitive strain or cumulative trauma injuries, significant costs are imposed on employers due to repetitive strain and cumulative trauma.

SUMMARY OF THE INVENTION

For the foregoing reasons, there is a need for a method and a system for cueing a user of a tool that overcomes or mitigates the defects and deficiencies of the prior art.

In its broad aspect, the invention provides a method of providing cueing signals to a user of a tool. The method includes the steps of positioning one or more engagement sensors for obtaining engagement data regarding the user's engagement with the tool. The engagement data is transmitted to the processor. With the processor, the engagement data is compared to a preselected acceptable engagement data range.

If the processor determines that the engagement data is outside the preselected acceptable engagement data range, then an alert signal is transmitted to an alert device. Upon its receipt of the alert signal, the alert device generates a cueing alert signal to indicate that the engagement data is outside the preselected acceptable engagement data range.

If the processor determines that the engagement data is within the preselected acceptable engagement data range, then a non-alert signal is transmitted to the alert device. Upon receipt of the non-alert signal, the alert device generates a cueing confirmation signal to indicate that the engagement data is within the preselected acceptable engagement data range.

In another of its aspects, the preselected acceptable engagement data range is amended to take objective data for the user into account, to provide a calibrated preselected acceptable range. The engagement data is compared to the calibrated preselected acceptable engagement data range. If the engagement data is outside the calibrated preselected engagement data range, then the alert signal is transmitted to the alert device. Upon receipt of the alert signal, the cueing alert signal is generated, to indicate that the engagement data is outside the calibrated preselected engagement data range. However, if the engagement data is not outside the calibrated preselected engagement data range, then a cueing confirmation signal is generated.

In another aspect, the calibrated acceptable engagement data range is amended to take subjective data for the user into account, to provide a subjective calibrated acceptable engagement data range. The engagement data is compared to the subjective calibrated preselected acceptable engagement data range. If the engagement data is outside the subjective calibrated preselected engagement data range, then the alert signal is transmitted to the alert device. Upon receipt of the alert signal, the cueing alert signal is generated, to indicate that the engagement data is outside the subjective calibrated preselected engagement data range. However, if the engagement data is not outside the subjective calibrated preselected engagement data range, then a cueing confirmation signal is generated.

In another of its aspects, the method includes positioning one or more pressure sensors, for measuring pressures or forces applied to the tool to provide applied force data. The applied force data is transmitted to the processor. With the processor, the applied force is determined, based on the applied force data.

With the processor, the applied force is compared to a preselected acceptable applied force range. If the processor determines that the applied force is outside the preselected acceptable applied force range, then an error signal is transmitted to the alert device. Upon receipt by the alert device of the error signal, a cueing alert signal is generated by the alert device, to indicate that the applied force is outside the preselected acceptable applied force range.

If the processor determines that the applied force is within the preselected applied force range, then a compliance signal is transmitted to the alert device. Upon receipt of the compliance signal, the alert device generates a cueing confirmation signal to indicate that the applied force is within the preselected acceptable total force range.

In another of its aspects, the invention provides a system for cueing a user of a tool. The system includes a processor, an alert device, and one or more engagement sensors positioned for obtaining engagement data regarding the user's engagement with the tool. The processor is configured to determine whether the engagement data is within a preselected acceptable engagement data range.

The processor is also configured to generate an error signal transmittable to the alert device upon the processor determining that the engagement data is outside the preselected acceptable engagement data range. Upon receipt thereby of the error signal, the alert device generates a cueing alert signal, to indicate that the engagement data is outside the preselected acceptable engagement data range.

The processor is also configured to generate a compliance signal transmittable to the alert device upon the processor determining that the engagement data is within the preselected acceptable engagement data range.

In yet another of its aspects, the invention provides a method of cueing a user of a tool utilizing position sensors. The method includes positioning one or more tool position sensors for sensing a position of the tool, and positioning one or more body position sensors for sensing a position of a body portion of the user, for providing respective tool and body portion position data regarding a tool position and a body portion position. The tool position data and the body position data are transmitted to a processor.

With the processor, the tool position relative to the body portion position is compared to a preselected range of acceptable tool positions relative to the body portion positions. In addition, the body portion position relative to the tool position is compared to a preselected range of acceptable body portion positions relative to the tool positions. If the tool position is outside the preselected acceptable range of tool positions relative to the body positions, then a tool error signal is transmitted to the alert device. Also, if the body portion position is outside the preselected range of acceptable body portion positions relative to the tool positions, then a body portion error signal is transmitted to the alert device.

Upon receipt by the alert device of the tool error signal, the alert device generates a tool cueing alert signal to indicate that the tool position is outside the preselected acceptable range of tool positions. In addition, upon receipt by the alert device of the body portion error signal, a body portion cueing alert signal is generated, to indicate that the body portion position is outside the preselected acceptable range of body portion positions.

If the tool position is within the preselected range of tool positions, then transmitting a tool position compliance signal is transmitted to the alert device. With the alert device, upon receipt thereof of the tool position compliance signal, a tool position confirmation signal is generated, to indicate that the tool position is within the preselected acceptable range of tool positions.

If the processor determines that the body portion position is within the preselected acceptable range of body portion positions, then a body portion position compliance signal is transmitted to the alert device. Upon receipt by the alert device of the body portion position compliance signal, a body portion position confirmation signal is generated, to indicate that the body portion position is within the preselected acceptable range of body portion positions.

BRIEF DESCRIPTION OF THE DRAWINGS

The invention will be better understood with reference to the attached drawings, in which.

DETAILED DESCRIPTION

Figure 1A:
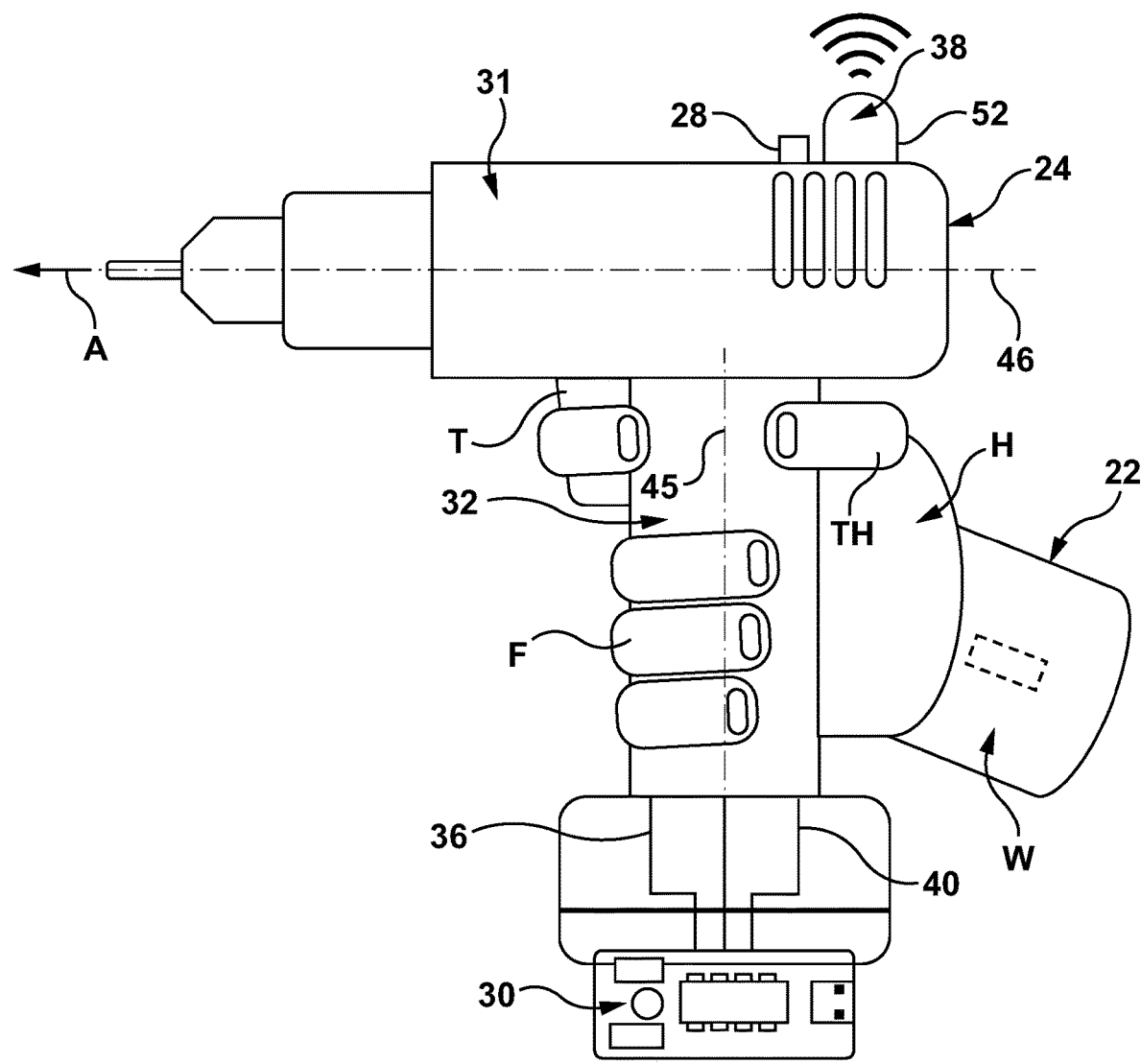
FIG. 1A is a side view of an embodiment of a tool assembly of the invention including a tool, in which a user is holding the tool.

In the attached drawings, like reference numerals designate corresponding elements throughout. Reference is first made to FIGS. 1A-12 to describe an embodiment of a system in accordance with the invention indicated generally by the numeral 20 (FIG. 8).

The system 20 preferably includes one or more engagement sensors, for providing data about engagement of a user's body portion with an object. As will be described, the engagement sensors may be position sensors, pressure sensors, or both position and pressure sensors. The object may be a tool, e.g., a tool used repetitively on an assembly line.

The engagement sensors may be mounted in any suitable manner. For example, certain sensors may be located in or on the tool. Certain of the engagement sensors may be mounted on the user, or in a glove worn by the user.

The data provided by the engagement sensors preferably is used to cue the user, for safer engagement of the user's body portion with the object, to minimize risk of injury. If the user is using the tool improperly (i.e., outside a preselected acceptable range of parameters), then a cueing alert signal preferably is provided to the user. In one embodiment, if the user is using the tool properly (i.e., within the preselected acceptable range of parameters), then a cueing confirmation signal is provided to the user. From the foregoing, it can be seen that the engagement sensors preferably provide substantially continuous data that is processed by the processor to provide the user with feedback on a substantially continuous basis, while the user uses the tool. Preferably, an individual user's historical or objective engagement data is taken into account in connection with determining the cueing signals to be provided to the specific individual user. Also, in one embodiment, subjective information provided by the individual user may also be taken into account in determining the cueing signals to be provided to that particular user.

The engagement data generated for a number of users who are doing the same tasks may be processed to provide guidelines for cueing signals for the group, and also to provide information to enable the users to engage with the tool more safely.

The engagement data may also be used to design a safer workplace. For instance, if the engagement data indicates that performing a particular task with the tool frequently results in the user engaging the tool in a manner that is outside acceptable norms, then the parameters of the task should be reconsidered. For example, if a task identified as frequently requiring user engagement outside an acceptable range requires the user to operate the tool in a position above the user's head, then the task probably should be changed so that the tool can be operated at a more comfortable height for the user.

Figure 1B:
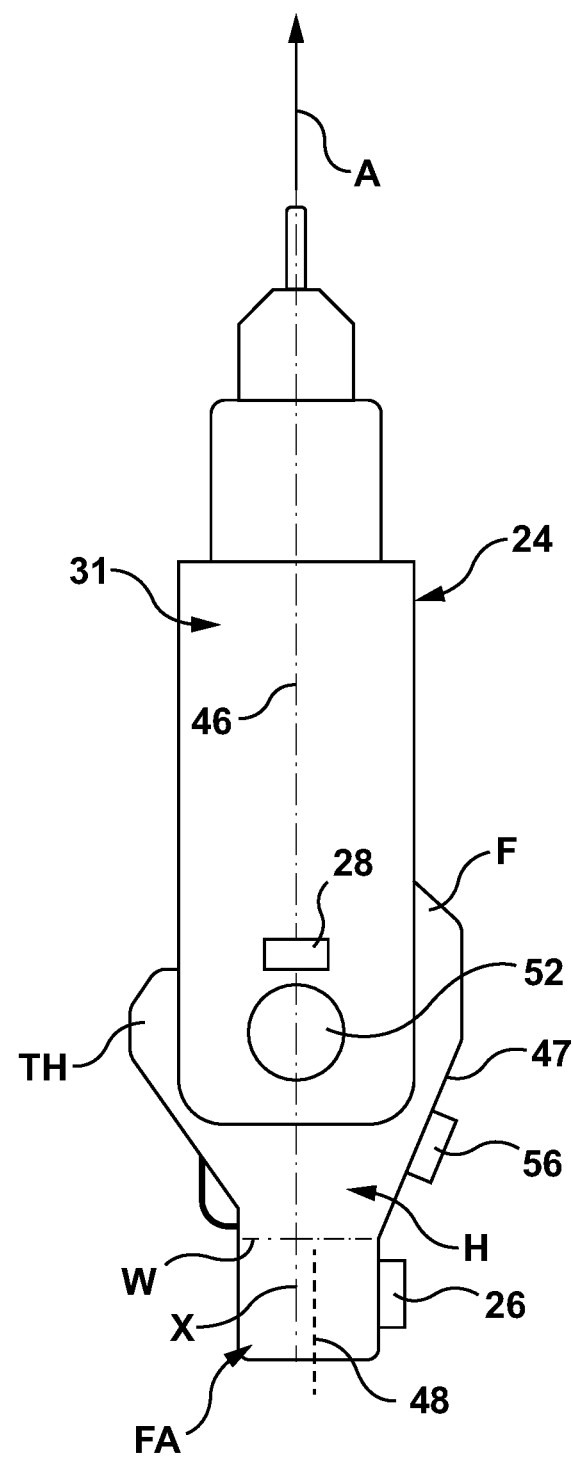
FIG. 1B is a top view of the tool assembly of FIG. 1A.

In one embodiment, the system 20 provides relative position information regarding a position of an object 24 engaged by the user relative to one or more selected body portions 22 of the user. In one embodiment, the system 20 preferably includes one or more first position sensors 26 mounted on the one or more selected body portions 22, and one or more second position sensors 28 mounted on the object 24 (FIGS. 1A, 1B). Preferably, the system 20 also includes a processor 30 (FIG. 1A), as will also be described.

An embodiment of the system 20 of the invention is illustrated in FIGS. 1A-3. In the illustrated embodiment, as an example, the sensor 26 is mounted on the user's forearm "FA", and the object 24 is a tool having a drive portion 31 and a handle portion 32 held by the user's hand "H" (FIG. 1A). In the illustrated example, the tool 24 may be, e.g., a nutrunner, or any other type of industrial torque wrench. In this example, the selected body portion 22 is the user's forearm "FA". In connection with the object 24 illustrated in FIGS. 1A-3, the user may change the position of the drive portion 31 relative to the forearm "FA" by moving the user's hand "H", as will be described.

It will be understood that the processor 30 may be located in any suitable location. In one embodiment, a tool assembly 18 preferably includes the tool 24, the second position sensors 28, and the processor 30 (FIG. 1A).

Preferably, the first position sensor 26 is configured to provide body portion data for determining one or more body portion positions of the selected body portion(s) 22. The system 20 preferably also includes means (not shown) for transmitting the body portion data to the processor 30. Those skilled in the art would appreciate that, preferably, the body portion data is transmitted wirelessly to the processor 30. The second position sensor 28 is configured to provide object data for determining one or more object positions of the object 24. It is also preferred that the system 20 includes means 36 for transmitting the object data to the processor 30 (FIG. 1A).

The processor 30 preferably is configured for determining, based on the body portion data and the object data, the object position of the object 24 relative to the body portion position of the selected body portion 22. It is also preferred that the processor 30 is configured for determining whether the object 24 is within a preselected range of acceptable object positions relative to the body portion position, as will be described.

In addition, the processor 30 is configured to generate one or more position alert signals indicating whether the selected body portion 22 is within a preselected range of acceptable body portion positions relative to the object position, as will also be described.

In one embodiment, the system 20 preferably also includes one or more alert devices 38 to which the position alert signal is transmitted. The position alert signal is a cueing alert signal, indicating that the position of the tool or the body portion, or the positions of both, are outside the preselected acceptable ranges. The alert device 38 preferably alerts the user, upon the alert device 38 receiving the position alert signal. Preferably, and as can be seen in FIG. 1A, the system 20 also includes means 40 for transmitting the position alert signal to the alert device 38.

As will be described, the alert device 38 preferably provides one or more suitable signals (e.g., a visual signal, and/or audio signal, and/or any other signal or message) to the user in order to cue the user, to enable the user to correct improper positioning of the tool, or of the body portion, or both. Those skilled in the art would appreciate that the data provided by the position sensors is processed in a very short time period, so that the user receives the cueing signal virtually instantaneously in response to a change in position. Because of this, the user is able to correct improper positioning immediately. As will be described, in one embodiment, the alert device preferably generates a cueing alert signal (which may be visual, audible, or another type of signal) to indicate that the engagement data is outside the preselected acceptable range of engagement data. It is also preferred that the alert device may generate a cueing confirmation signal (which may be visual, audible, or another type of signal), to indicate that the engagement data is within the preselected acceptable range of engagement data.

It is preferred that the system 20 provides cueing information to the user that is tailored to that specific user. In order to permit this, the system 20 preferably is configured to enable an individual user to identify himself or herself (e.g., by entering an employee or identification number), and to sign into the system 20. It is expected that the user may do this, for example, at the beginning of the user's shift. Those skilled in the art would appreciate that sign-in procedures preferably involve suitable security protocols and procedures. Those skilled in the art would also be aware of suitable security protocols and procedures.

From the foregoing, it can be seen that the system 20 preferably provides cueing information (i.e., cueing signals) to the user that is specifically related to the user. In connection with the position sensors, the cueing information is at least partially based on the user's physical characteristics or habits or tendencies.

The position sensors 26, 28 may be any suitable sensors. Those skilled in the art would be aware of suitable position sensors. In one embodiment, for example, the position sensors 26, 28 may include one or more accelerometers (not shown). In an alternative embodiment, one or both of the position sensors 26, 28 may be inertial sensors.

As will be described, the locations of the position sensors 26, 28 on the selected body portion 22 and on the object 24 are important. For instance, in the examples illustrated in FIGS. 1A-2C, the second position sensor 28 preferably is located along a drive axis 46 of the drive portion 31 of the tool 24.

In the example illustrated in FIGS. 1A-2D, the object 24 is a conventional hand-held tool. The tool may be, for example, an industrial torque wrench (e.g., a nutrunner). In operation, the drive portion 31 is configured to rotate a socket or other engagement element (not shown) about the drive axis 46 (FIGS. 1A, 1B), as the engagement element engages a part, such as a nut or a bolt (not shown). The drive portion 31 preferably is elongate, and substantially defined by the drive axis 46. The handle portion 32 preferably is also elongate, and positioned generally transverse to the drive axis 46 (FIG. 1A). The handle portion 32 defines a handle axis 45.

Those skilled in the art would appreciate that the handle portion 32 may have any suitable configuration. The tool position sensors may be mounted in or on the tool, in any suitable manner. At least some of the position sensors may be located in a glove worn by the user.

When the tool is in use, the user holds the handle portion 32 in the user's hand "H", with the palm of the hand at least partially engaged with the handle portion 32, as shown in FIGS. 1A and 1B. The tool may be activated by the user's finger depressing a trigger "T" that is included in the handle portion 32 (FIG. 1A).

The user's fingers "F" and thumb "TH" are engaged with the handle portion 32 when the user grasps the handle portion 32, while the user uses the tool (FIGS. 1A, 2A-2C).

As can be seen in FIGS. 1A-2C, because the palm of the user's hand at least partially engages the handle portion 32, the back 47 of the user's hand is positioned facing away from the handle portion 32, and generally located transverse to the drive axis 46.

From the foregoing, it can be seen that the user who is holding the handle portion 32 as illustrated in FIGS. 1A and 1B may, by moving his hand "H" relative to his forearm "FA", change the position of the drive axis 46 relative to the forearm "FA". The location of the wrist joint "W" is schematically indicated in FIGS. 1B-2C.

It will be understood that, in the example illustrated, in order for the user to engage the tool's engagement element with the part, the user is required to urge the tool in the direction indicated by arrow "A" in FIGS. 1A and 1B. In the example illustrated in FIGS. 1A-2C, the user's grasp of the handle portion 32 enables the user to urge or push the entire tool 24 in the direction indicated by arrow "A". When a central plane 48 is substantially parallel with the drive axis 46, the thenar of the hand "H" and webbing 50 on the user's hand between the thumb and the forefinger engage the handle portion 32, pushing against the handle portion 32, to urge the tool in the direction indicated by arrow "A".

It will be understood that, ideally, the tool is designed so that when it is held by the user, the drive axis 46 is aligned, or substantially aligned, with the central plane 48 of the forearm "FA". (Those skilled in the art would appreciate that the tool may not be designed for such alignment.) As shown in FIGS. 1B and 2B, the tool may be held so that the drive axis 46 is parallel with the central plane 48, but not aligned with it. In this situation, it is preferred that the drive axis 46 is positioned parallel with the central plane 48. Accordingly, the drive axis 46 preferably is aligned with an offset axis "X" of the forearm "FA" that is offset from the central plane by an offset distance "D" (FIG. 2B). It is preferred that the offset distance "D" is a relatively short distance.

Figure 2A:
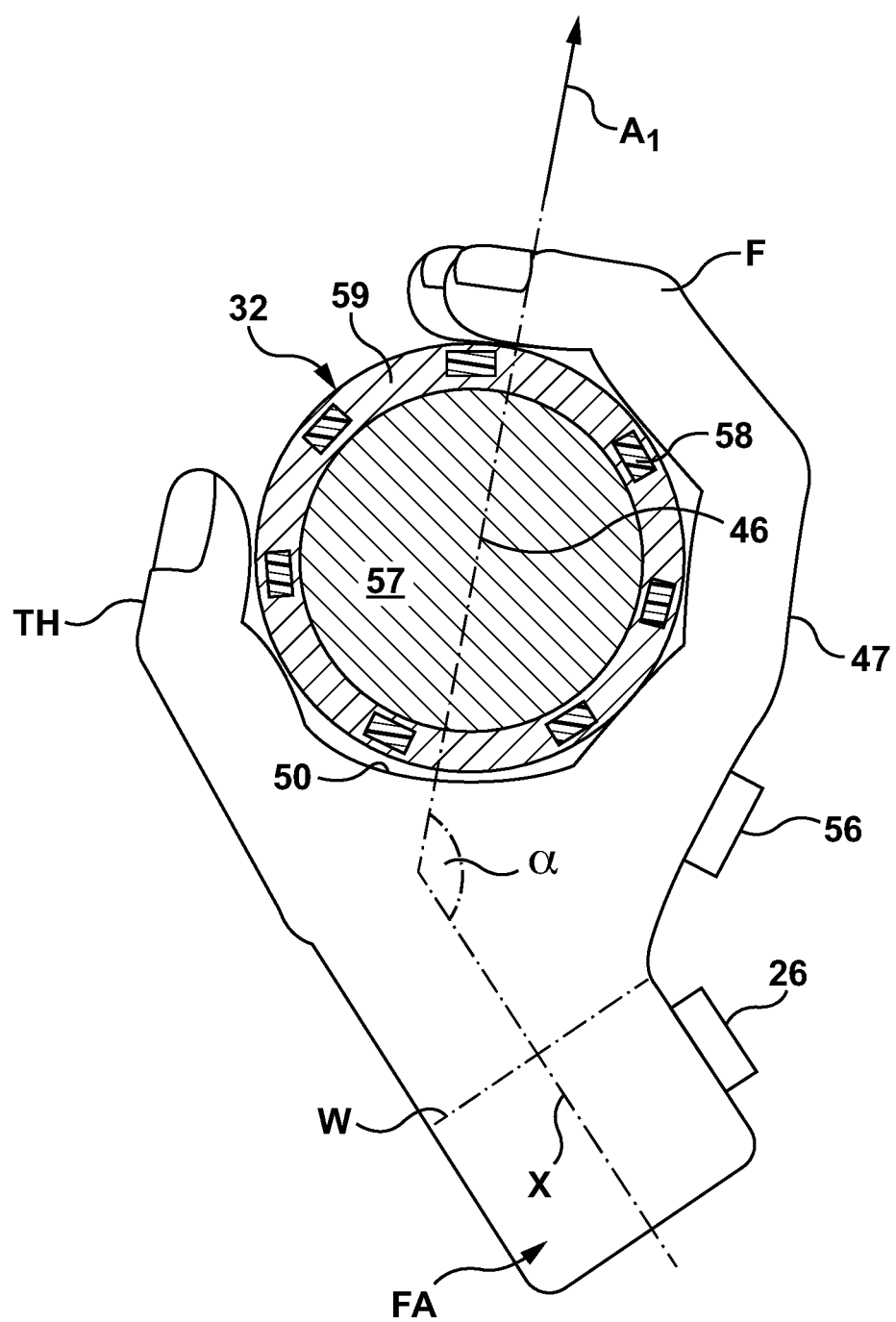
FIG. 2A is a cross-section of a handle portion of the tool of FIGS. 1A and 1B, showing the user's hand engaged with the handle portion and the user's wrist in an extension condition, drawn at a larger scale.
Figure 2B:
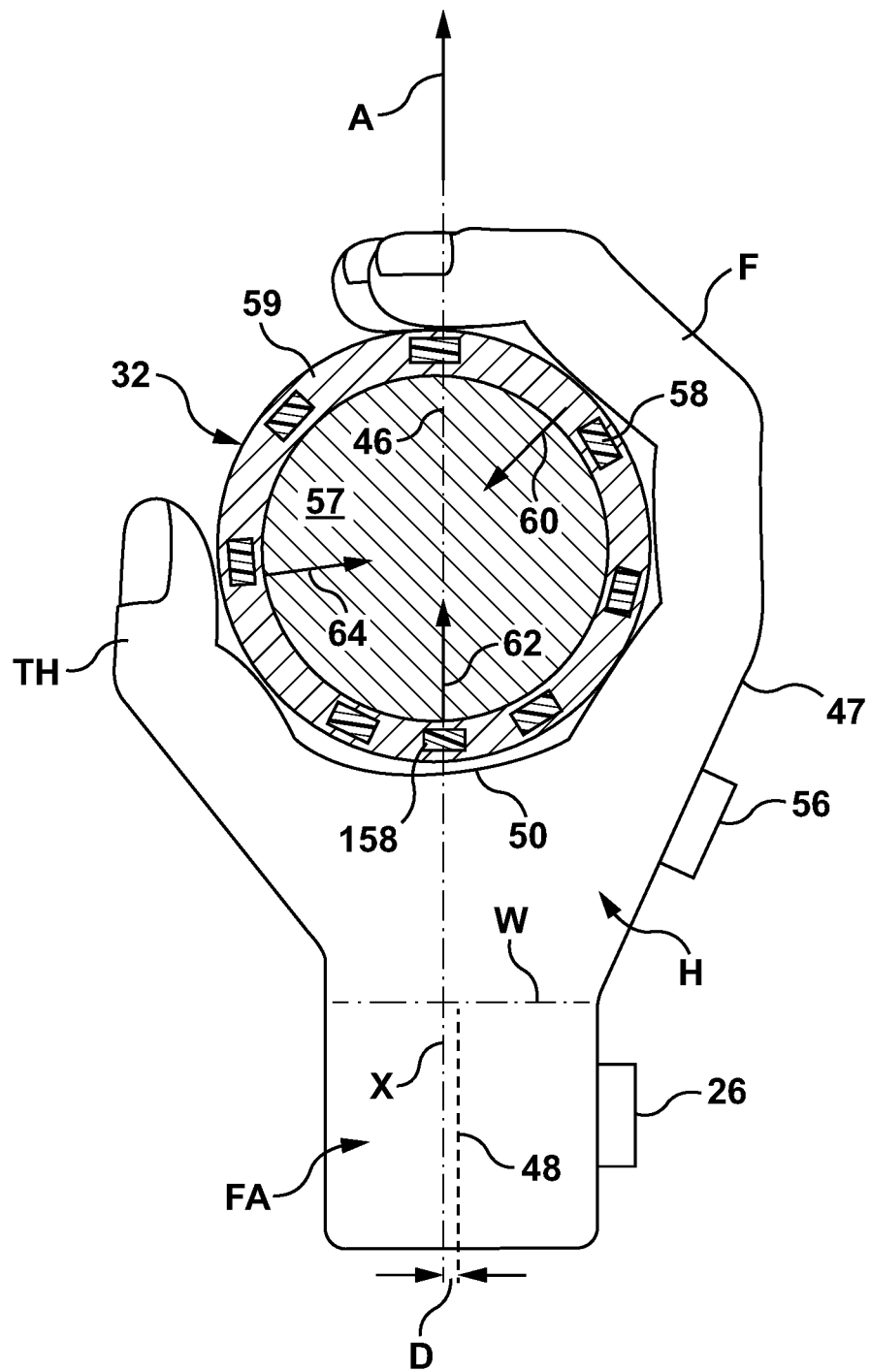
FIG. 2B is a cross-section of the handle of FIG. 2A, showing the user's hand and wrist in a neutral condition.
Figure 2C:
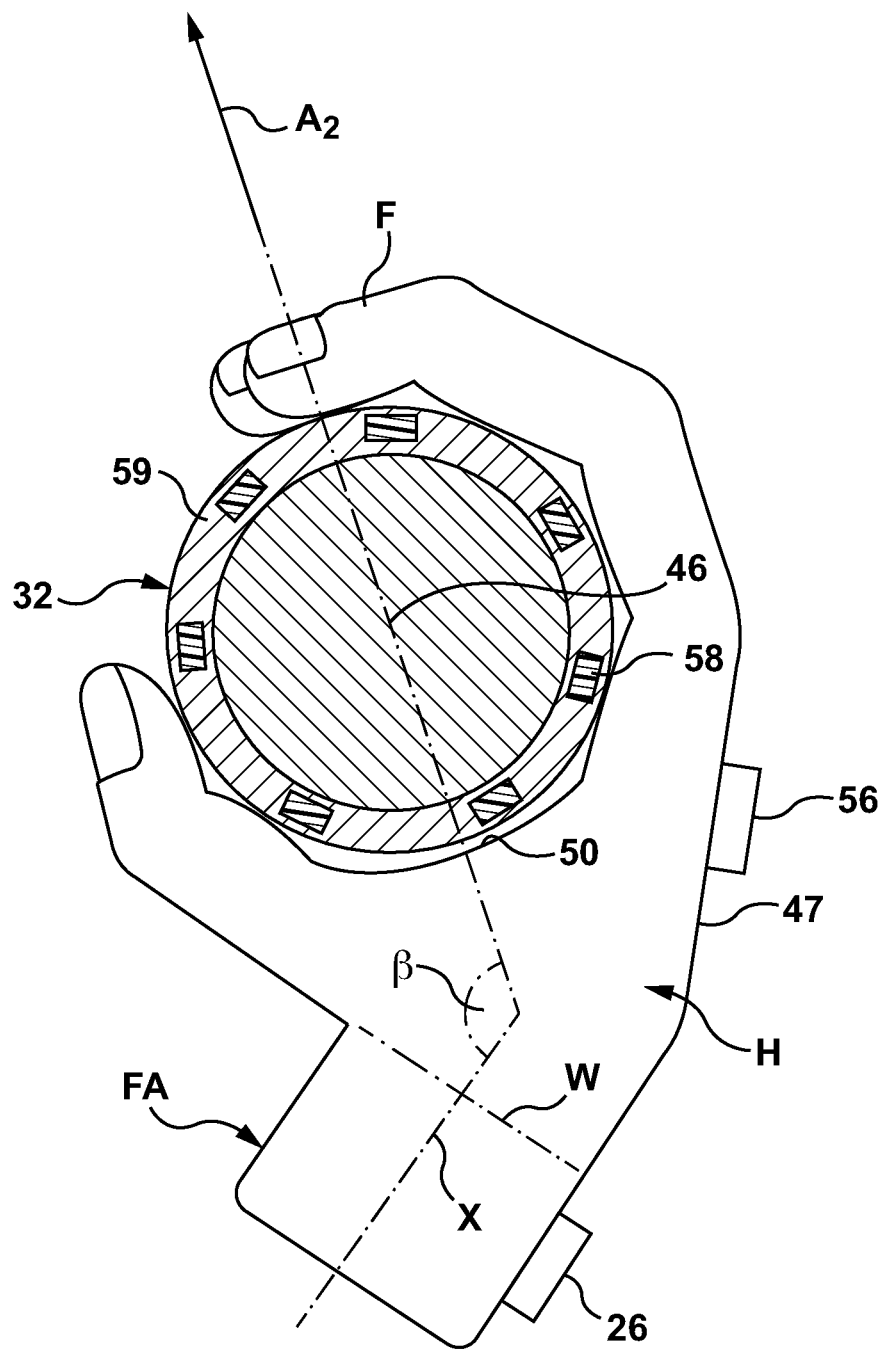
FIG. 2C is a cross-section of the handle of FIGS. 2A and 2B, showing the user's hand and wrist in a flexion condition.

As can be seen in FIGS. 1B-2C, in an alternative embodiment, the system 20 preferably includes a third position sensor 56, located on the back 47 of the user's hand "H". It will be understood that the position data from the third position sensor 56 and the position data from the second position sensor 28 may be utilized to determine whether the user's hand "H" is positioned within a preselected range of acceptable hand positions relative to the user's forearm "FA". In the event that the back 47 of the user's hand is not positioned, relative to the forearm "FA", within the preselected range of acceptable hand positions, then one or more position alert signals is generated by the processor 30. For illustrative purposes, FIGS. 2A and 2C show the hand in positions outside the predetermined range of acceptable body portion positions relative to the object position.

It will also be understood that the system 20 preferably is calibrated for each individual user. In one embodiment, calibration for a particular user preferably is based on historical data (i.e., objective data) for that user. In effect, the calibration may take into account each user's habits, or physical characteristics, however, such calibration does not permit positioning outside the preselected acceptable range. Such calibration may be redone or updated from time to time, to take changes in the user's habits into account. As will be described, in one embodiment, subjective data provided by the user may also be used to modify the preselected acceptable range.

Preferably, the preselected acceptable range (of engagement data, of positions of the tool, of positions of the body, and/or of pressure(s), as the case may be) is determined for all users generally. However, in one embodiment, the preselected acceptable range preferably is modified (i.e., calibrated) to take objective characteristics of an individual user into account. For the purposes hereof, a preselected acceptable range (of engagement data, of positions of the tool, of positions of the body, and/or of pressure(s), as the case may be) that has been subjected to such modification or calibration, based on objective data related to the user, is sometimes referred herein to as a calibrated preselected acceptable range (of data). The calibrated preselected acceptable range that is modified by subjective data is sometimes referred to herein as a subjective calibrated acceptable range (of data).

The system 20 may, in one embodiment, include only the first position sensor 26 and the third position sensor 56, omitting any position sensor(s) that may be located on the object. Alternatively, the system may include all three position sensors 26, 28, 56.

Figure 2D:
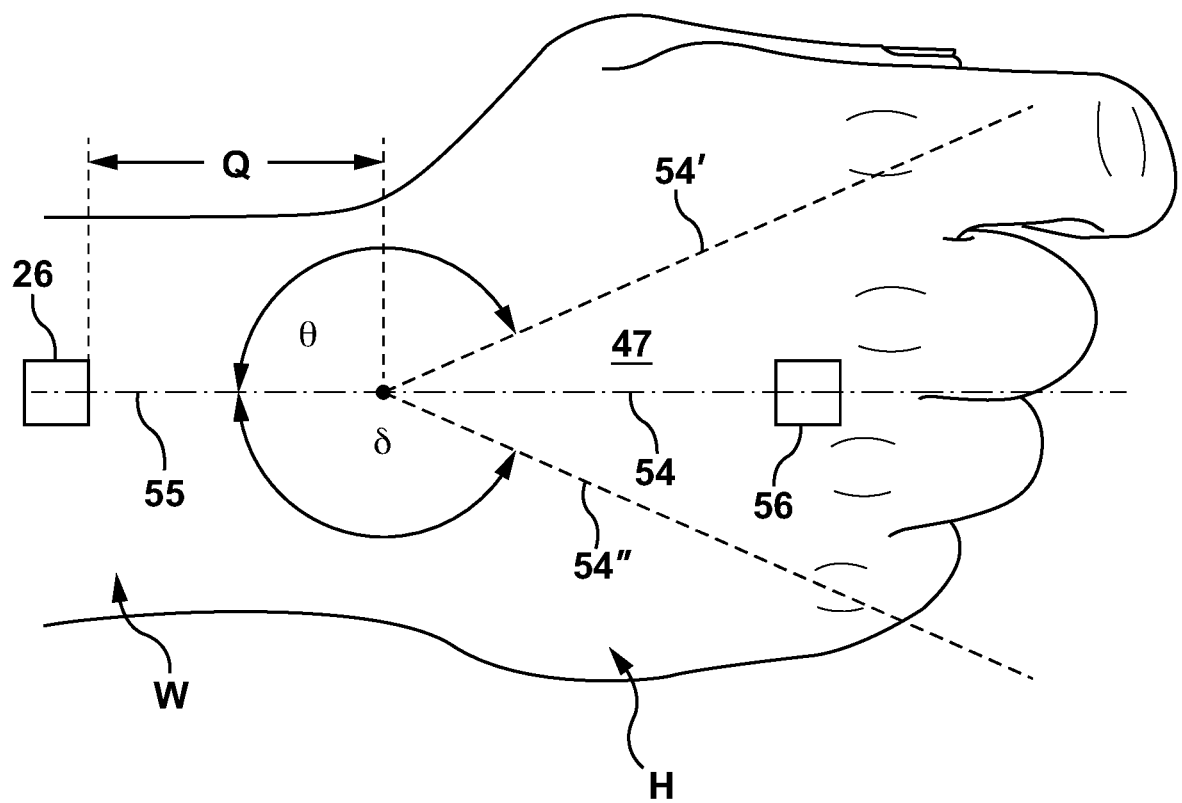
FIG. 2D is a side view of the hand and wrist of FIGS. 2A-2C, drawn at a larger scale.

It will be understood that, as illustrated in FIGS. 2A-2C, the hand "H" is subjected to neither adduction nor abduction at the wrist "W", as will be described. Instead, in FIGS. 2A-2C, the hand "H" is illustrated in an intermediate position relative to the body, as shown in FIG. 2D. To minimize the stress to which the wrist "W" is subjected, it is preferred that the hand "H" is in the intermediate position as illustrated in FIG. 2D, when the hand "H" is holding the handle portion 32 of the tool 24. It will be understood that the object is omitted from FIG. 2D for clarity of illustration.

As can be seen in FIG. 2B, when the tool 24 is held so that the drive axis 46 is parallel to or aligned with the central plane 48 of the forearm "FA", the user's hand "H" is positioned relative to the forearm "FA" so that the wrist "W" is subjected to minimal stresses.

In contrast, in FIG. 2A, the wrist "W" is subjected to extension, and the offset axis "X" and the drive axis 46 define an obtuse angle α opening away from the thumb "TH", and toward the back 47 of the hand "H". In FIG. 2C, the wrist "W" is subjected to flexion, and the offset axis "X" and the drive axis 46 define an obtuse angle β opening toward the thumb, and away from the back 47 of the hand "H".

Those skilled in the art would appreciate that, if the user continuously or frequently holds the tool as shown in FIG. 2A while urging the tool in the direction indicated by arrow "$A_1$", the user is likely to experience more stress than necessary in the wrist "W". Similarly, if the user continuously or frequently holds the tool as shown in FIG. 2C while urging the tool in the direction indicated by arrow "$A_2$", the user is likely to experience more stress than necessary in the wrist "W". In both of these situations (i.e., when the wrist "W" is subjected to extension or flexion), the wrist is subjected to more stresses than is necessary, and discomfort and/or injury to the user's wrist may result. In particular, if the wrist is frequently or continuously subjected to extension or flexion over an extended period of time, discomfort and/or injury to the user's wrist is likely to result.

Preferably, via the alert device 38, the system 20 provides feedback (i.e., cueing signals) to the user that is in real time, or substantially in real time, to enable the user to address incorrect hand positioning, such as that illustrated in FIGS. 2A and 2C. The feedback may be tailored to the individual user. It will be understood that the alert device 38 may provide the feedback information in any suitable manner or manners. For example, in one embodiment, the alert device 38 preferably includes a light element 52 and/or a display that provides visual information. The alert device 38 may include other elements, e.g., to provide audible warnings, or haptic signals. The alert device 38 may also generate e-mail or SMS or MMS messages.

As will be discussed, the position data over time for a particular user preferably is saved, so that it may be used to identify recurring issues in inappropriate positioning by the individual user, if any. If recurring issues are identified, they may be addressed in a training session for the individual user. Also, the position data over time in the aggregate, by a group of users who are performing the same tasks, may be analyzed to determine any common or chronic issues affecting a number of users.

Those skilled in the art would appreciate that any suitable signal, or signals, may be utilized for cueing or informing the user. In one simple form, for instance, the alert device 38 preferably includes the light element 52 (FIGS. 1A, 1B). For example, the light element 52 may be configured to provide a green illuminated light when the user's hand "H" locates the drive axis 46 is within the preselected range of acceptable object positions relative to the central plane 48 of the forearm "FA", and to provide a red illuminated light where the drive axis 46 is located outside the preselected range of acceptable object positions relative to the central plane 48 of the forearm "FA".

It will be understood that the system may include a number of light elements. If the system 20 includes the third position sensor 56, then the alert device may be configured to provide a green illuminated light when the back 47 of the user's hand is within the preselected range of acceptable hand positions relative to the central plane 48 of the forearm "FA". A red light signal may be provided if the back 47 of the user's hand is outside the preselected range of acceptable hand positions relative to the central plane 48 of the forearm "FA".

In the examples illustrated in FIGS. 1A-2C, as noted above, the range of preselected acceptable object positions would include the drive axis 46 being parallel or aligned with the central plane 48, within the preselected range. Those skilled in the art would appreciate that the preselected range may be determined based on test data, and may be any suitable range. For instance, it may be determined that it is acceptable if the drive axis 46 deviates from alignment with the central plane (or from alignment with the offset axis "X", as the case may be), up to 5°. Those skilled in the art would also appreciate that the preselected acceptable range may be amended from time to time, as more data is obtained.

Similarly, the preselected acceptable range of positions of the back 47 of the hand relative to the central plane 48 of the forearm "FA" preferably includes what are considered to be acceptable deviations from an ideal location of the back of the hand relative to the central plane 48. Such ideal location may be the location of the back of the hand when the drive axis 46 is aligned with the central plane 48.

The alert device 38 may provide any suitable signals. It is preferred that the alert device 38, whether providing audio, visual, and/or some other signal, is sufficiently unobtrusive that it does not distract the user or others during operation of the tool, but also is sufficiently noticeable that the user will be aware of the cueing signal provided by the alert device 38. For example, if the alert device 38 includes the light element 52, then the light element 52 preferably is positioned so that it is within the user's peripheral vision, when the user is using the tool 24. In this way, the user may be aware of the color of the light emanating from the light element 52 (e.g., green, or red, as the case may be) while the user is operating the tool, so that if the light is red, the user adjust his hand position, to cause the light to be green.

As a practical matter, maintaining a precise alignment of the drive axis 46 with the central plane 48, or a precise alignment of the drive axis 46 with the offset axis "X", may be extremely difficult. Those skilled in the art would appreciate that it may be advantageous to utilize the alert device to signal to the user that the drive axis 46, although not within the preselected range of alignment with the central plane 48 (or the offset axis "X", as the case may be), is relatively close to alignment.

For instance, the processor 30 may be configured to generate an intermediate cueing signal that causes the light element 52 to emit yellow light when the drive axis 46 is positioned in an intermediate zone relative to the central plane 48 or the offset axis "X". When the drive axis deviates beyond a predetermined angle (e.g., 10°) from the central plane 48 or the offset axis "X", the light element 52 emits red light, and when the drive axis is outside the preselected acceptable range but does not deviate beyond the predetermined angle, the light element 52 is caused to emit a yellow light. Using the ranges provided, for instance, this would mean that when deviation of the drive axis 46 from alignment with the central plane 48 (or the offset axis "X", as the case may be) is greater than 5° but less than 10°, the light element 52 emits yellow light, in this example.

As can be seen in FIG. 2D, the hand "H" may be located so that a center line 54 centered on the back 47 of the hand is aligned with a center line 55 of the forearm "FA". For the purposes hereof, the hand is in its intermediate position relative to the forearm "FA" when the center line 54 and the center line 55 of the forearm are aligned.

Preferably, the first position sensor 26 is located on the center line 55 of the forearm "FA". It is preferred that the position sensor 26 is located spaced apart from the hand "H" by a predetermined distance "Q".

The hand "H" may be pivoted upwardly (as illustrated in FIG. 2D) so that the center line 54' and the center line 55 define an angle Θ therebetween. (It will be understood that the position of the line 54' relative to the line 54 is exaggerated for clarity of illustration.) When the hand is in such position, the hand "H" is said to be abducted relative to the user's body.

Alternatively, the hand "H" may be pivoted downwardly so that the center line 54" and the center line 55 define an angle δ therebetween. (It will be understood that position of the line 54" relative to the line 54 is exaggerated for clarity of illustration.) When the hand is in such position, the hand "H" is said to be adducted relative to the user's body.

As noted above, it will be understood that in the views as illustrated in FIGS. 1B-2C, there is neither abduction nor adduction, and the hand "H" is in the intermediate position. Those skilled in the art would appreciate that, when the hand "H" is in the intermediate position, the wrist "W" is not subjected to significant stress due to the position of the hand "H" relative to the central plane 48.

As also noted above, in one embodiment, the system 20 preferably includes the third position sensor 56 located on the back 47 of the hand "H", on the center line 54 (FIG. 2D). The position sensor 56 preferably provides information about the position of the hand "H" to the processor 30.

The location of the position sensor 56 may be compared to the location of the position sensor 26 that is located on the forearm "FA". It is preferred that acceptable ranges of abduction and adduction are determined. If the hand is located outside a preselected acceptable range of positions of the center line 54 relative to the center line 55, another alert signal is generated by the processor 30, which is transmitted to the alarm device 38. Preferably, the alert signal generated due to improper positioning of the position sensor 56 relative to the position sensor 26 on the forearm "FA" is distinguishable over the alert signals that may be generated due to improper positioning of the object relative to the central plane 48 of the wrist "W" or relative to the offset axis "X", as the case may be.

It will be understood that one or more position sensors may be positioned on other body portions, for use in determining the positions of the body portions relative to objects other than the tool. For example, position sensors (not shown) may be located on the user's upper and lower back, to determine whether the user is bending his back to an extent greater than recommended when lifting an object.

Although only one tool is illustrated in FIGS. 1A-2C, it will be understood that the system 20 may include a number of tools used by a number of users.

As noted above, instead of or in addition to the position sensors, the engagement sensors may be force or pressure sensors. In one embodiment, the system 20 preferably includes one or more pressure sensors 58 mounted to the object 24, for obtaining force or pressure data regarding one or more loads applied to the object 24 by the user. As an example, in FIGS. 2A-2C, it can be seen that a number of pressure sensors 58 preferably are mounted in the handle portion 32 of the tool.

It will be understood that the system may include pressure sensors and position sensors, or only pressure sensors, or only position sensors.

It will be understood that, in one embodiment, the pressure or force sensors 58 may be mounted in or on the object 24, in any suitable manner. As illustrated in FIG. 2B, for example, the handle portion 32 includes a core 57 and an outer covering 59 in which the pressure sensors 58 are positioned. In the example illustrated in FIGS. 2A-2C, seven pressure sensors are illustrated, however, those skilled in the art would appreciate that any suitable number of pressure sensors 58 may be used, positioned in any suitable manner.

In an alternative embodiment, one or more pressure sensors may be positioned in a glove (not shown) worn by the user, or otherwise positioned for measuring pressure applied by the user to the tool or portions thereof.

It is preferred that the force data includes information about the quantum or amount of force exerted against the object by the user. In the example illustrated in FIGS. 2A-2C, the pressure sensors 58 provide data indicating how tightly the user squeezes the handle portion 32. The pressure sensors 58 may be any suitable force or pressure sensors. Those skilled in the art would be aware of suitable force or pressure sensors.

Preferably, the processor 30 is configured for processing the force data, for determining whether the force data is within a preselected range of acceptable forces. It is also preferred that the processor 30 generates one or more alarm signals if the force applied to the handle portion 32 is outside the preselected range of acceptable forces.

It will be understood that the system 20 also includes means for transmitting the force data to the processor 30. The system 20 preferably also includes one or more alarm devices for alerting the user, upon the alarm device receiving the alarm signal. The alarm signal is transmitted to the alarm device(s) by means for transmitting the alarm signal.

In one embodiment, the locations of the one or more pressure sensors 58 on or in the tool 24 preferably are selected so as to obtain comprehensive data about the force that the user is applying to the tool. In the example illustrated in FIGS. 2A-2C, for instance, seven pressure sensors are shown, positioned substantially equidistant from each other and located around a cross-section of the handle portion 32.

From the foregoing, it can be seen that the pressure sensors preferably provide information about the extent to which the user is squeezing, or gripping, the handle portion 32, sometimes collectively referred to hereinafter as "grip force". However, the pressure sensors also provide data regarding the force applied by the user to urge the tool in the direction indicated by arrow "A", sometimes hereinafter collectively referred to as "push force".

In one embodiment, the system 20 preferably includes a pressure sensor 158 (FIG. 2B) generally aligned with the direction indicated by arrow "A". However, those skilled in the art would appreciate that the force data provided by the pressure sensor 158 is not exclusively related to the user's push force (i.e., the force applied urging the tool in the direction indicated), because the total force applied to the sensor 158 is also due, in part, to the user gripping the handle portion 32. For clarity of illustration, the sensor 158 is omitted from FIGS. 2A and 2C.

In one embodiment, the processor preferably is configured to compare the total applied force (i.e., the grip force and the push force, at a minimum) and compare the total applied force to a preselected acceptable total force range, i.e., a range of total applied forces that is acceptable. If the total applied force is not within the preselected acceptable total force range, then an error signal is generated by the processor, and transmitted to the alert device 38. It is also preferred that the alert device 38 is configured to generate an alarm signal to indicate that the total applied force is outside the preselected acceptable total force range. For instance, the alarm signal may be provided (i) if the total applied force exceeds the preselected acceptable total force range, or (ii) if the total applied force is less than the preselected acceptable total force range. In this way, the alert device 38 provides a cueing signal to the user, who may then take appropriate action, to provide a total applied force that is within the preselected acceptable total force range.

As noted above, in one embodiment, the cueing signal preferably is provided based on the specific user's personal (historical) data.

In the event that the total applied force is within the preselected acceptable total force range, a compliance signal is transmitted to the alert device 38. Upon receipt thereof, the alert device 38 generates a cueing confirmation signal, which is a cueing signal that confirms to the user that the total applied forces are within the preselected acceptable total force range.

As noted above, in the examples illustrated, the total applied force may be thought of, in the simplest terms and for the purposes hereof, as the sum of the grip force and the push force applied to the object or tool. (Those skilled in the art would appreciate that other forces, e.g., friction, may also need to be taken into account.) It is believed that the cueing signal based on exceeding the total applied force may be useful in practice because the user may respond to the alarm signal by, e.g., consciously relaxing the user's grip. If, after so doing, another alarm signal is generated, then the user may consciously decrease the push force applied. In this way, even though the user is provided with cueing signals that only refer to the total applied force, the user may by a short process of trial and error determine how to exert a total applied force that is within the preselected acceptable total force range.

As noted above, the alarm signal may also be generated if the total force applied is less than the preselected acceptable total force range. Such an alarm signal may be different from the signal generated when total force exceeds the preselected acceptable total force range. Preferably, upon receipt of such an alarm signal, the user increases the pressure (i.e., grip force, or push force, or both) in order to provide sufficient pressure that the total force or pressure applied is within the preselected acceptable total force range. As noted above, in one embodiment, once the total force applied is within the preselected acceptable total force range, the system preferably generates a compliance signal, to let the user know.

In one embodiment, after the total applied force is measured, the grip force and the push force may be estimated. For example, based on the positions of the pressure sensors, the (measured) total applied force may be decoupled into distinct grip force and push force distributions. It will be understood that forces other than grip and push forces (e.g., forces related to friction effects) may be taken into account, for accuracy. Based partly on total pressure map data, the push force distribution is estimated, and the grip force distribution can then be determined, by subtraction.

From the foregoing, it can be seen that the grip force distribution and the push force distribution, once estimated, may be used to provide different cueing signals to the user, to indicate whether (i) grip force is within the preselected acceptable range, and/or (ii) whether push force is within the preselected acceptable range therefor. Preferably, the user's historical force data may be utilized, to educate the user.

In one embodiment, another pressure sensor (not shown) may be mounted on the trigger "T", to measure the force applied by the user to the trigger. Ideally, the user applies only the amount of force or pressure needed for activation of the tool, by depressing the trigger, and does not press harder onto the trigger than necessary. Preferably, the system compares the actual pressure applied to the trigger to the minimum pressure needed for activation of the tool. It will be understood that the relationship between the pressure applied to the trigger and the grip and push forces may be estimated, in order to provide an estimated trigger pressure. It is also preferred that the system 20 includes suitable alert devices to advise the user (i) when the pressure applied to the trigger "T" exceeds a preselected acceptable trigger force, and (ii) when the pressure applied to the trigger "T" is within the preselected acceptable range.

From the foregoing, it can be seen that different force data may be processed to determine different forces, to cue the user, e.g.: (a) total applied force; (b) grip force; (c) push force; and (d) force applied to the trigger. For the purposes hereof, "applied force data" may sometimes herein refer to any one or more of total applied force data, grip force data, push force data, and/or data regarding force applied to the trigger. The "applied force data" is processed to determine an "applied force", which for the purposes hereof may be understood to be any one or more of total applied force, grip force, push force, and/or force applied to the trigger.

The "applied force" may be compared to a "preselected acceptable applied force range". From the foregoing, it can be seen that the preselected acceptable applied force range may be understood to be related to any one or more of total applied force, grip force, push force, and/or force applied to the trigger.

As noted above, both position and pressure sensors may be used in the system. In this situation, the alert device preferably provides one or more cueing signals upon determining that the total force applied is outside the preselected acceptable total force range that differ sufficiently from the cueing signals provided by the alert device upon determining that the position of the object and/or of a body portion is not within the preselected acceptable range thereof. It is preferred that the user can readily distinguish between the alert signal provided in respect of improper positioning of the tool, and the alert signal provided in respect of force that is applied outside the preselected range of acceptable forces. To that end, it may be expedient to physically separate the alert device and the alarm device on the object 24, to make it easy for the user to distinguish between (i) the alert provided by the alert device, and (ii) the alarm provided by the alert device. Those skilled in the art would appreciate that, preferably, the user is given training to enable the user to react properly to the cueing signals.

In use, the user grasps the handle portion 32 and wraps his fingers "F" and thumb "TH" around the handle portion 32. The force is exerted by the fingers, the palm, and the thumb as schematically represented by arrows 60, 62, and 64 respectively (FIG. 2B). The tool may include a trigger. In the example illustrated in FIG. 1A, the handle portion 32 also includes the trigger "T", which the user depresses with his forefinger when the user chooses, to activate the tool.

Preferably, the pressure sensors 58 determine the forces exerted on the handle by the palm and fingers "F" and thumb "TH" of the hand. As noted above, if the user is exerting too much or too little total applied force on the handle portion 32, an appropriate cueing signal is given, and the user then may adjust the force exerted by the user on the handle portion 32 accordingly.

From the foregoing, it can be seen that the system 20 provides feedback to the user regarding the force exerted by the user on the handle portion 32, substantially in real time. If the user is applying too much force, then a cueing signal will substantially instantaneously signal this to the user. Similarly, if too little force is applied, the user will be advised by a suitable cueing signal. Also, if the force applied is within the preselected acceptable force range, an appropriate cueing signal is generated, confirming to the user that he or she is applying force within an acceptable range. As noted above, the force data may include data distinguishing between different forces applied by the user, e.g., urging or pushing force, and squeezing or gripping force. The feedback in real time, or substantially in real time, enables the user to adjust accordingly promptly, thereby minimizing the unnecessary stresses to which the user's hand and wrist might otherwise be subjected. The real-time cueing also has an educational benefit, as the user is shown, via cueing signals, what is an appropriate amount of force to use, and what isn't. Preferably, the real-time cueing is continuous, i.e., it is provided while the user is physically engaging the tool, to enable the user to correct improper positioning or application of force or both.

It will be understood that the position data and the force data that is gathered preferably is stored for future reference, as will be described. Those skilled in the art would appreciate that data may be stored locally temporarily, and uploaded to permanent storage regularly.

From the foregoing, it can be seen that the system may include position sensors, or pressure sensors, or in an alternative embodiment, the system may include both position sensors and pressure sensors.

In addition, the user may be cued by the system to move his hand relative to his forearm to locate the wrist in a neutral position (FIG. 2B) based on pressure sensors alone. This is possible because the user applies forces differently to the handle portion 32 depending on whether the user's wrist is in an extended, neutral, or flexed position (as illustrated in FIGS. 2A, 2B, 2C, respectively). With a sufficient number of pressure sensors positioned on the tool, and with individual (user-specific) calibration, and utilizing machine learning techniques, the position of the user's wrist (i.e., the position of the hand relative to the forearm) may be determined based on data from the pressure sensors alone, due to differences in force applied at different locations on the tool handle portion 32. This embodiment has the advantage that position sensors are not required in order to cue the user to change his hand position so that the wrist is neutral.

In the foregoing description, as examples, the engagement sensors (i.e., the position sensors, and the pressure sensors) have been described as being mounted in or on a tool, and certain of the position sensors have been described as being mounted on body portions. It will be understood that the engagement sensors may, alternatively, be located elsewhere, e.g., in or on a glove worn by a user, or otherwise positioned for engagement. In a further alternative arrangement, certain of the engagement sensors may be located in or on the glove, and other engagement sensors may be located elsewhere.

Preferably, a log is kept for the tool that can provide data (e.g., summary metrics and statistics). It is preferred that data for each user may be identified as relating to a specific user. The data from the log can also be reviewed to determine, for instance, the extent to which the feedback provided is effective. Other information may be obtained from the tool log, e.g., relating to the amount of time spent on specific tasks.

As noted above, the historical or objective information for a particular user preferably is used to adapt cueing parameters, i.e., to determine individually tailored or calibrated preselected ranges of acceptable positions and forces, so that the cueing parameters (i.e., resulting from the calibrated preselected acceptable range) are suitable for the specific individual user.

The historical information for the particular user preferably includes only objective information. However, in one embodiment, subjective information provided by the user may also be taken into account in determining cueing parameters for a specific individual.

A preselected acceptable range is determined that is generally applicable for all users. As noted above, the generally applicable preselected acceptable range (i.e., of engagement data, of tool positions, of body portion positions, and/or of pressure(s), as the case may be) preferably is modified for an individual user based on that user's objective data to provide a "calibrated acceptable range" for that individual user. In one embodiment, subjective information for that individual user may also be taken into account by further amending the calibrated acceptable range to provide a "subjective calibrated acceptable range" (of engagement data, of positions of the tool, of body portion positions, and/or of pressure(s), as the case may be).

From the foregoing, it can be seen that the "calibrated preselected acceptable range" determines appropriate cueing parameters for a specific individual user, based on objective data for that user. The "subjective calibrated preselected acceptable range" determines appropriate cueing parameters for a specific individual user, based on the objective data and on the subjective data for that user.

In one embodiment, the method of the invention includes obtaining objective measurements (step 63) related to tasks performed by the user with the sensors attached, as described above (step 61). There may be minimum thresholds established (i.e., preselected acceptable ranges), and also user-specific thresholds may be established. If the minimum thresholds are exceeded, then the feedback signalled to the user (step 65) preferably prompts the user to reduce (or increase) force or correct his hand and wrist positions (step 67). The user data is recorded (step 69). If the user does not respond to the feedback signals, then the user data is recorded and flagged (step 71).

Figure 3:
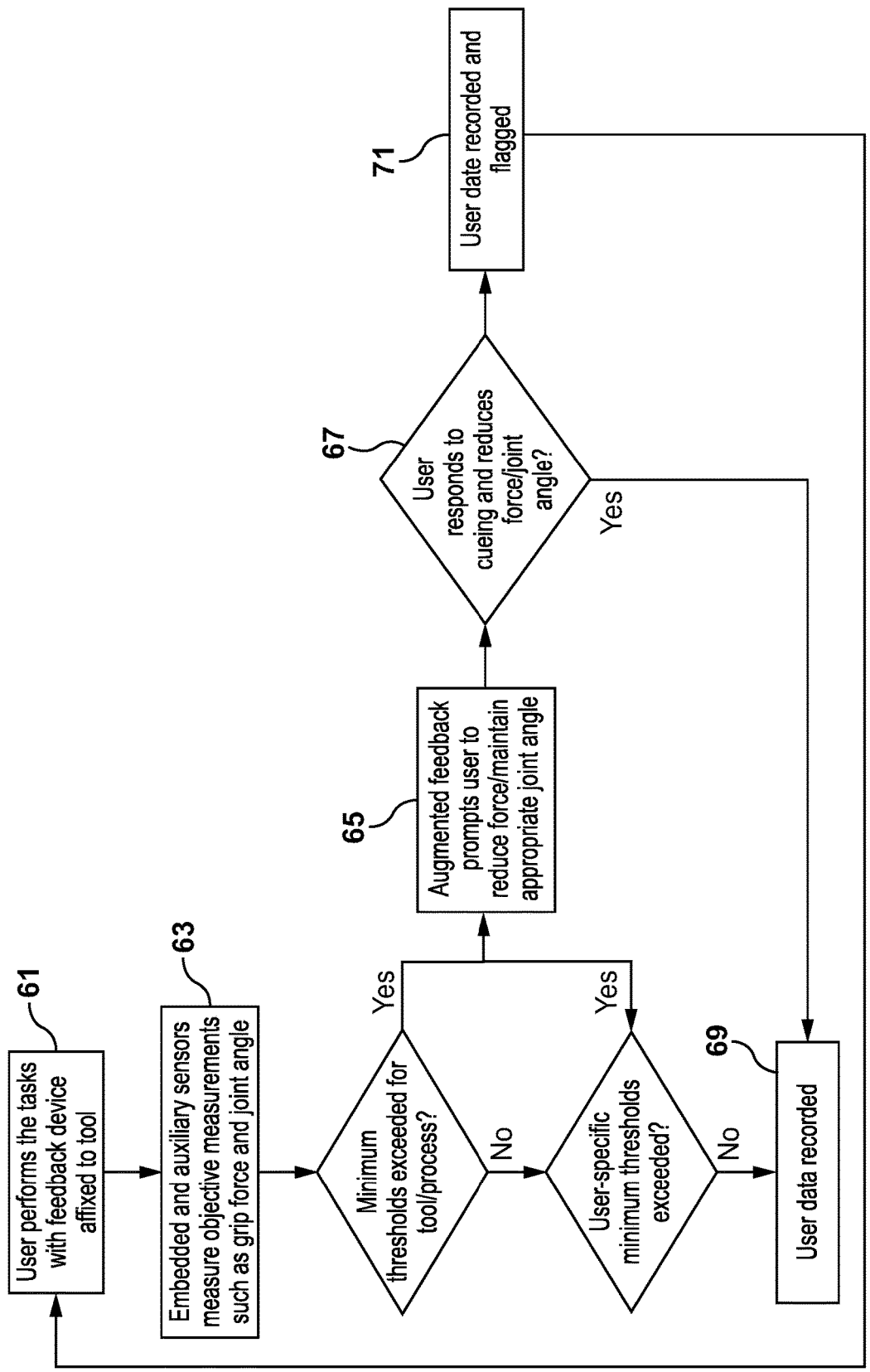
FIG. 3 is a flow chart illustrating an embodiment of a method of the invention.

It will be understood that the position data and the force data for a particular user that is accumulated and stored may enable adjustments to be made to the preselected range of object positions, and/or the preselected range of acceptable forces. In particular, it may be found, for example, that an optimum range of acceptable forces for one user differs from the optimum range of acceptable forces for another user. As illustrated in FIG. 3, the process may involve user-specific minimum thresholds, e.g., for force, and/or relative positions of the object and the body portion.

Figure 4:
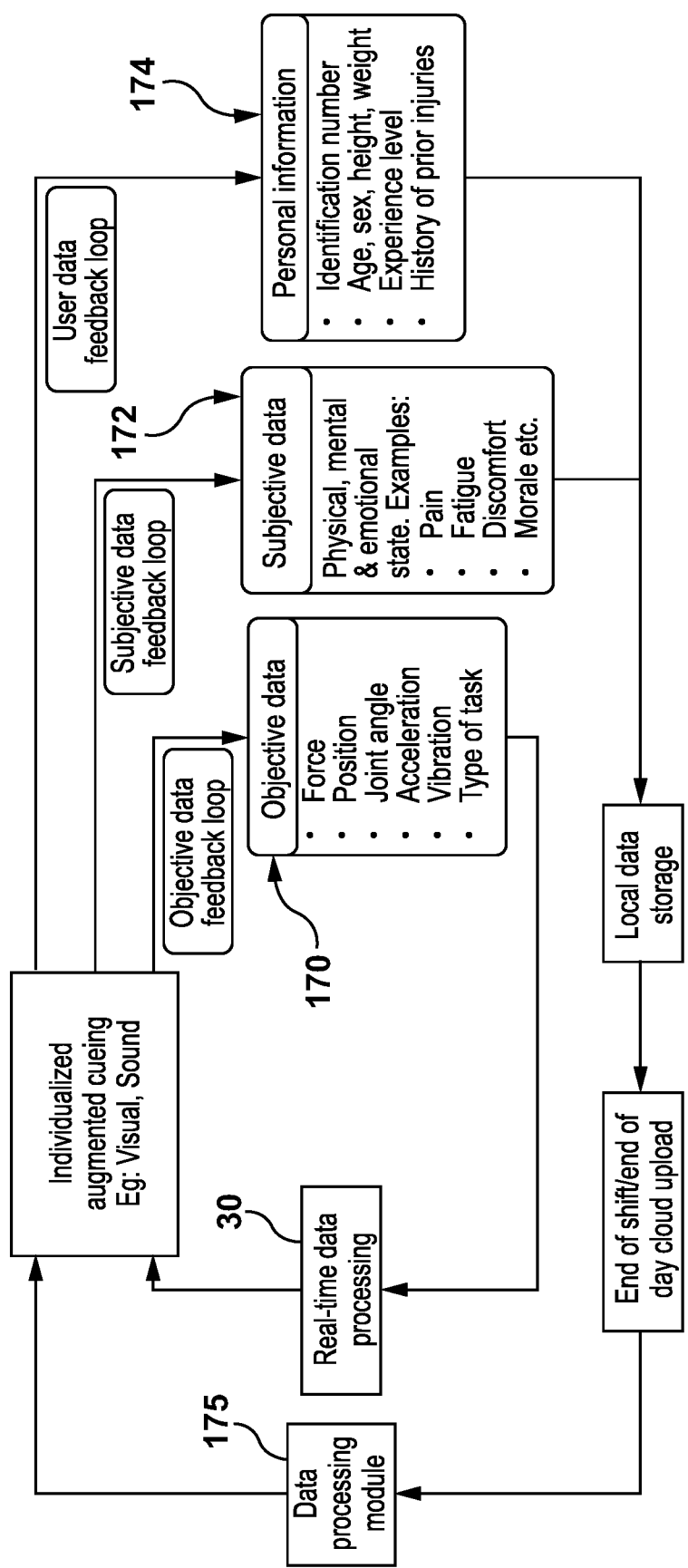
FIG. 4 is a schematic diagram representing selected aspects of the method of the invention.

Referring to FIG. 4, it can be seen that the real-time processing described above involves processing the objective data 170 referred to in FIG. 4. However, the system 20 preferably also includes means for enabling the user to input subjective data 172 into the system, e.g., at the beginning of the user's shift. Those skilled in the art would appreciate that the means to enable input of subjective data may include, e.g., a suitable application on a mobile device. The subjective data 172 may include, for example, such comments as the user provides regarding how the user is feeling. As will be described, the subjective data 172 that is accumulated over time may be utilized, for a specific user, or collectively for a group of users, with a view to determining improvements in proper use of the tool.

Preferably, the data gathered includes personal information 174, to permit an identification of the user. The personal information 174 may include health information (e.g., a previous injury or condition). With this information, the specific user may be provided with advice appropriate to him that will enable that user to improve the positioning of his hand and forearm relative to the tool, and/or the force he exerts on the handle portion 32. Preferably, data may be temporarily stored locally, and when appropriate (at the end of shift or the end of each day), data is uploaded to a data processing module 175. Those skilled in the art would appreciate that the personal information 174 and other information about the user must be obtained and stored in compliance with applicable privacy legislation.

Figure 5:
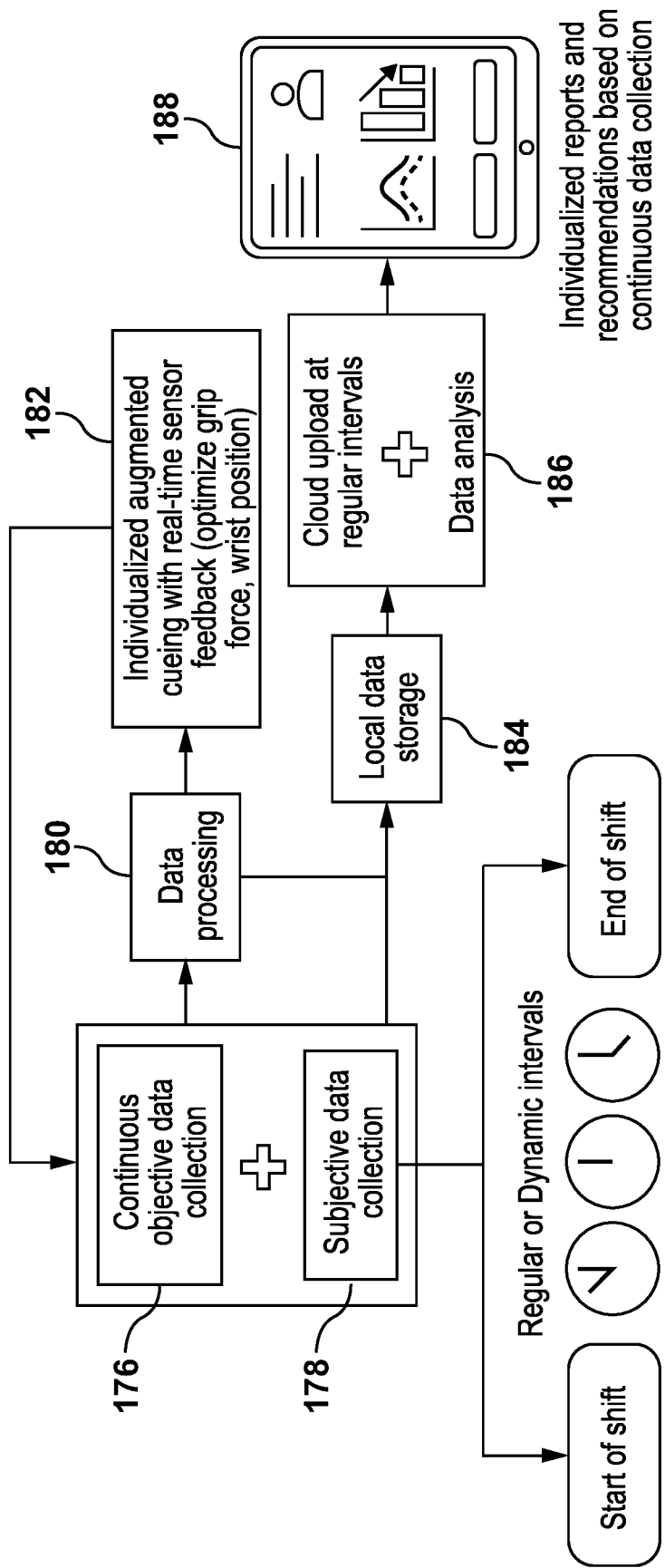
FIG. 5 is a schematic diagram illustrating an embodiment of the method of the invention.

The manner in which the data that is gathered is schematically represented in FIG. 5. In the embodiment of the method of the invention of FIG. 5, objective data preferably is continuously collected (step 176), and subjective data is also collected (step 178). It is preferred that the objective data is continuously collected over the user's shift. The subjective information may be input at any convenient or appropriate time. Preferably, the data that is collected is processed (step 180), in real time or shortly after it has been collected. As noted above, this data processing preferably is done by the processor 30. This enables individualized augmented cueing to take place in real time (step 182).

The data gathered and processed preferably is stored and then utilized to provide information about a particular user over time, with a view to determining whether there are trends or indicators that indicate that remediation or adjustment may be necessary or advisable, beyond that suggested in real time. The data may be stored and processed in any suitable manner. As indicated in FIG. 5, the data may be stored locally (step 184) and periodically uploaded (e.g., to the cloud). Preferably, at suitable intervals, reports and recommendations are generated that may are specific to the user (step 188).

Figure 6:
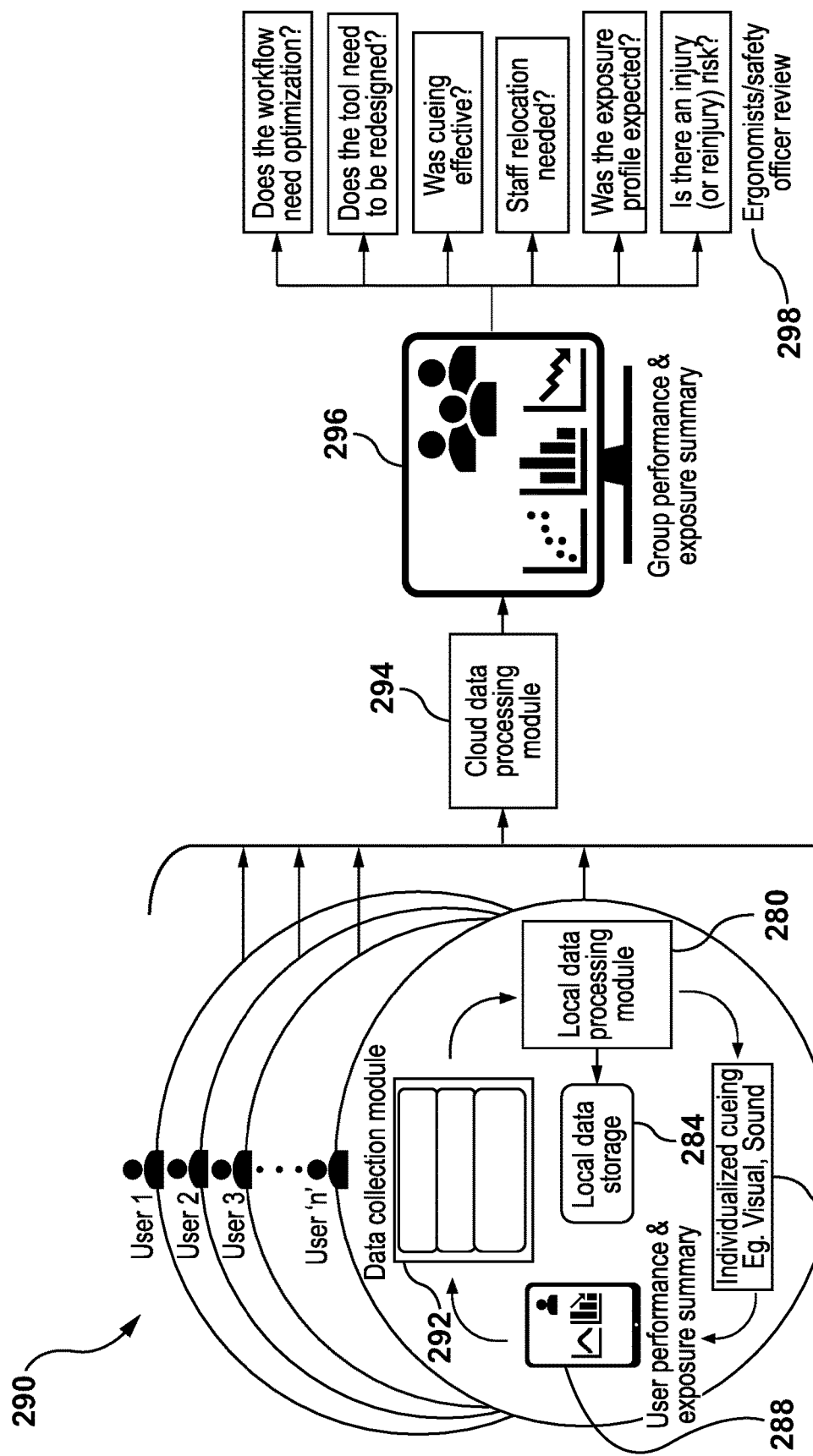
FIG. 6 is a schematic diagram illustrating another embodiment of the method of the invention.

As schematically illustrated in FIG. 6, the data for a group 290 of the users may be collected. As noted above, the subjective and objective data may be collected for each user (step 292), processed in the local data processing module 30 (step 280) and stored locally (step 284), to provide individualized cueing (step 282) and an individualized report (step 288).

The data for the group 290 preferably is processed (step 294) to provide a group performance and exposure summary (step 296). The summary provides information enabling an ergonomist or safety officer to consider adjustments and improvements (step 298).

It is anticipated that in any group, some users will have more prompts from the system, and some will have fewer prompts. Also, of those who receive prompts for changing position and/or force, some will respond quickly and positively, and others may not. Those who are not responding to prompts from the system are likely to experience discomfort or injury.

It is believed that comparing the experiences of the users in a group in which all of the users are doing the same task (or the same tasks) can help to identify the users who are more frequently alerted by the system than others, and also those who are not responding to the feedback provided by the system. It is understood that an earlier identification of the users who are more frequently prompted by the system, and also those who are less frequently responding to the feedback provided, will enable earlier actions to address issues that may ultimately result in the user in question suffering discomfort, health problems, or injury.

Privacy issues may be a concern. However, competitions between groups may provide incentives to users to respond to feedback, to enable the group to achieve better health and safety records. A public focus on group performance rather than on any public identification of particular users may ameliorate concerns about privacy, depending on the sizes of the groups.

Figure 7:
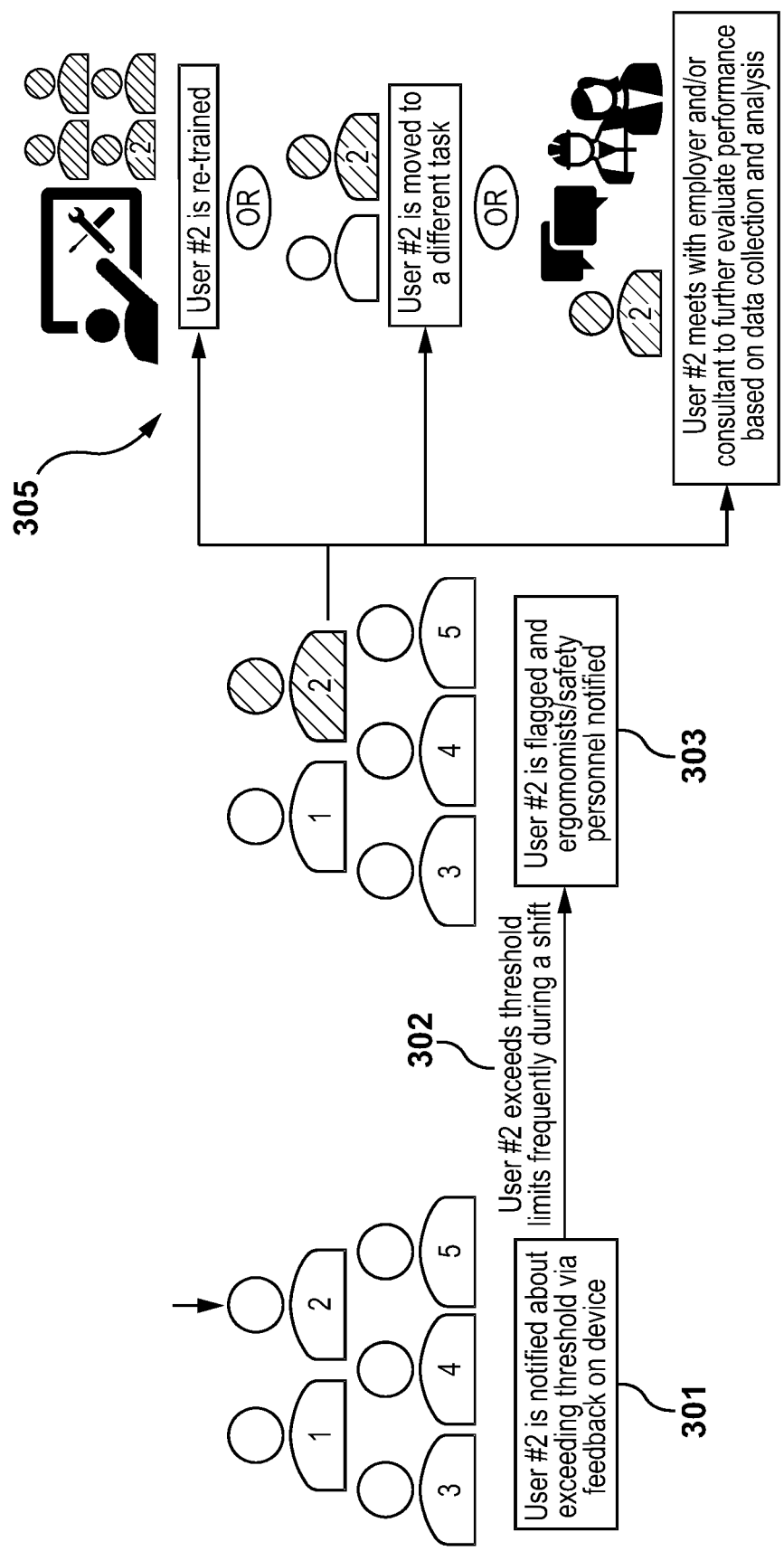
FIG. 7 is a schematic diagram illustrating another embodiment of the method of the invention.
Figure 8:
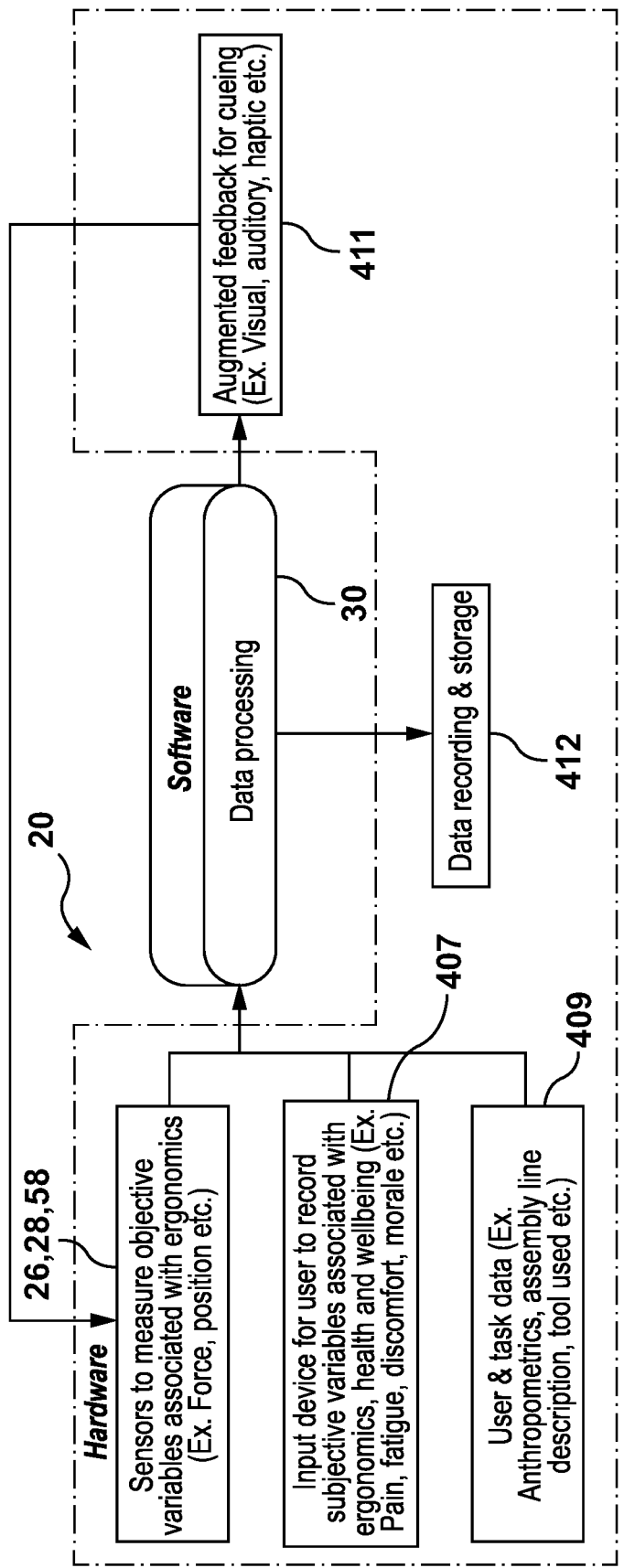
FIG. 8 is a schematic diagram illustrating an embodiment of the system of the invention.

A hypothetical example of the manner in which the group summary (step 296) may indicate that one or more adjustments are needed, and examples the types of recommendations that may be made as a result, are illustrated in FIG. 7. First, in a group of five users, user #2 is notified (preferably, in real time) about exceeding one or more thresholds, e.g., regarding position, and/or force (step 301). In the hypothetical example illustrated in FIG. 7, user #2 subsequently frequently exceeds threshold limits during a shift (step 302), and in a summary provided by the system, user #2 is identified accordingly and the appropriate health and safety personnel are notified (step 303). As indicated in step 305, the health and safety personnel take such steps as are necessary or advisable to address the issue. Those skilled in the art would appreciate that the appropriate actions would vary according to the circumstances for each individual user in this situation.

An embodiment of the system 20 is schematically illustrated in FIG. 8. As can be seen in FIG. 8, the hardware includes the sensors 26, 28, 58, and an input device 407 for the user to record subjective input. User and task data 409 is also input, and the data is processed, e.g., by the processor 30, to provide feedback 411 to the user. As noted above, the data preferably is stored 412 in any suitable manner.

Figure 9:
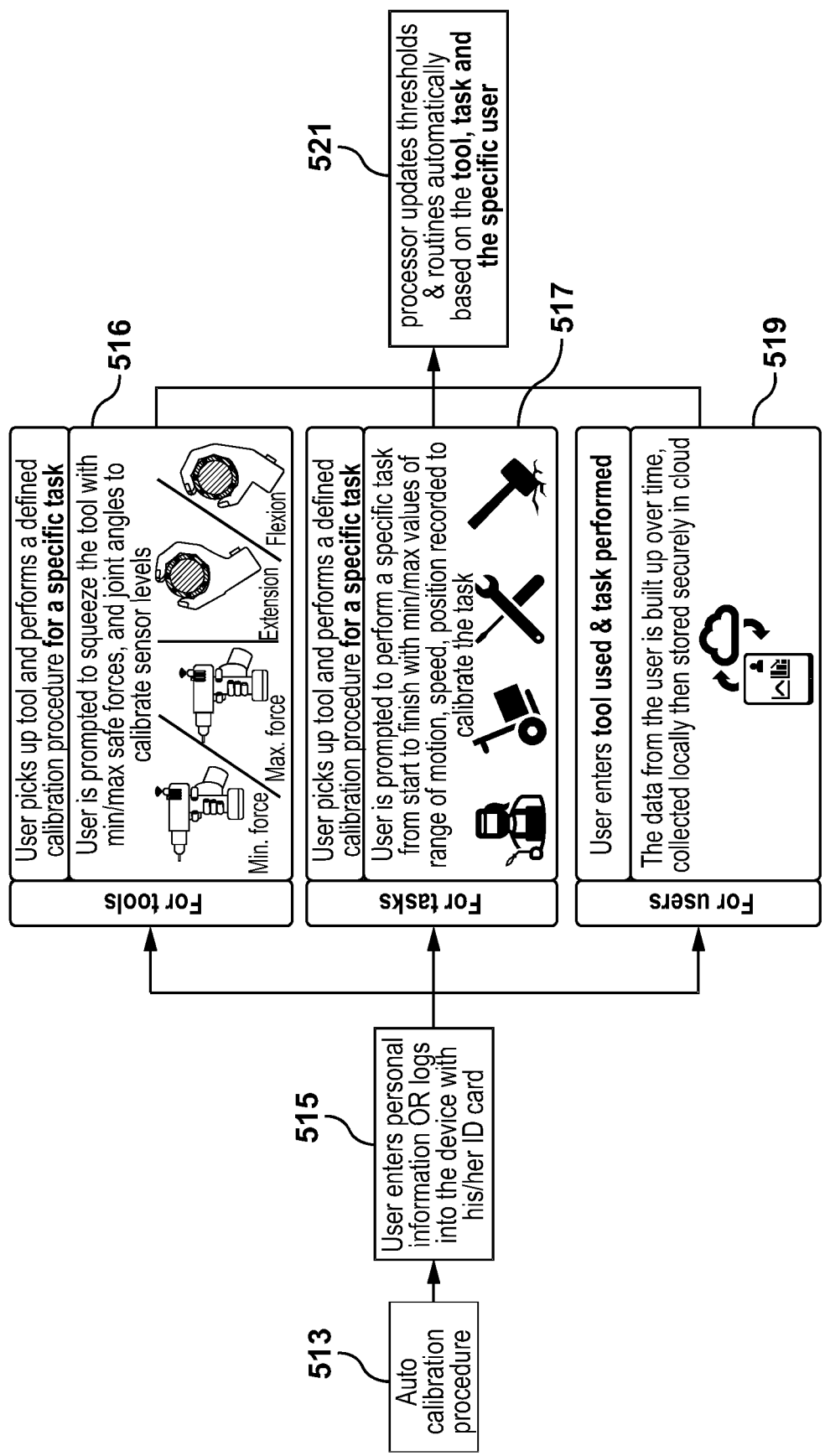
FIG. 9 is a schematic diagram illustrating another embodiment of the method of the invention.

In one embodiment, the system 20 preferably includes an automatic calibration procedure 513 (FIG. 9). The user first logs in (step 515). The user holds the tool and executes a predetermined calibration procedure for a specific task. For example, the user may be prompted to squeeze the handle portion with minimum and maximum safe forces, and also to hold the tool using predetermined positions of the hand and wrist, to calibrate sensor levels (step 516). Alternatively, the user may execute the calibration procedure for a specific task, in which the user is prompted to complete the task using minimum and maximum values of range of motion, speed, and position (step 517). Using the input device, the user indicates the tool used and the task performed (step 519). The data is stored for future processing, and the processor 30 also updates thresholds and routines automatically based on the tool, task, and the user (step 521).

Figure 10:
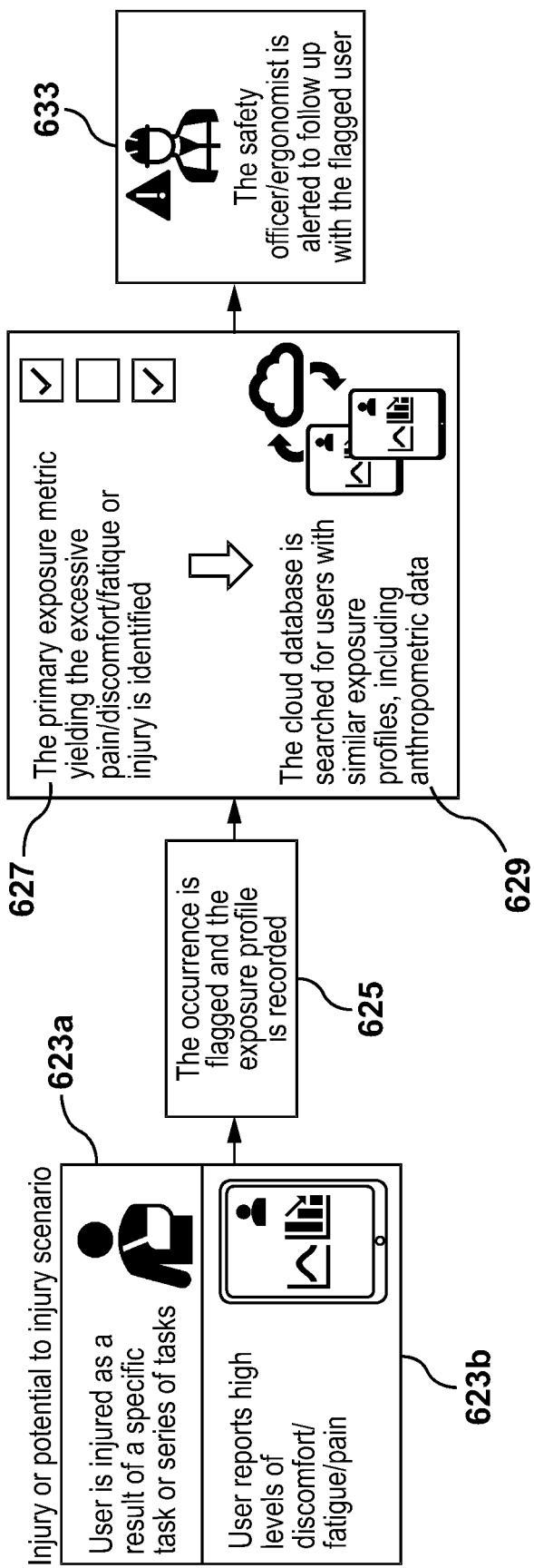
FIG. 10 is a schematic diagram illustrating another embodiment of the method of the invention.
Figure 11:
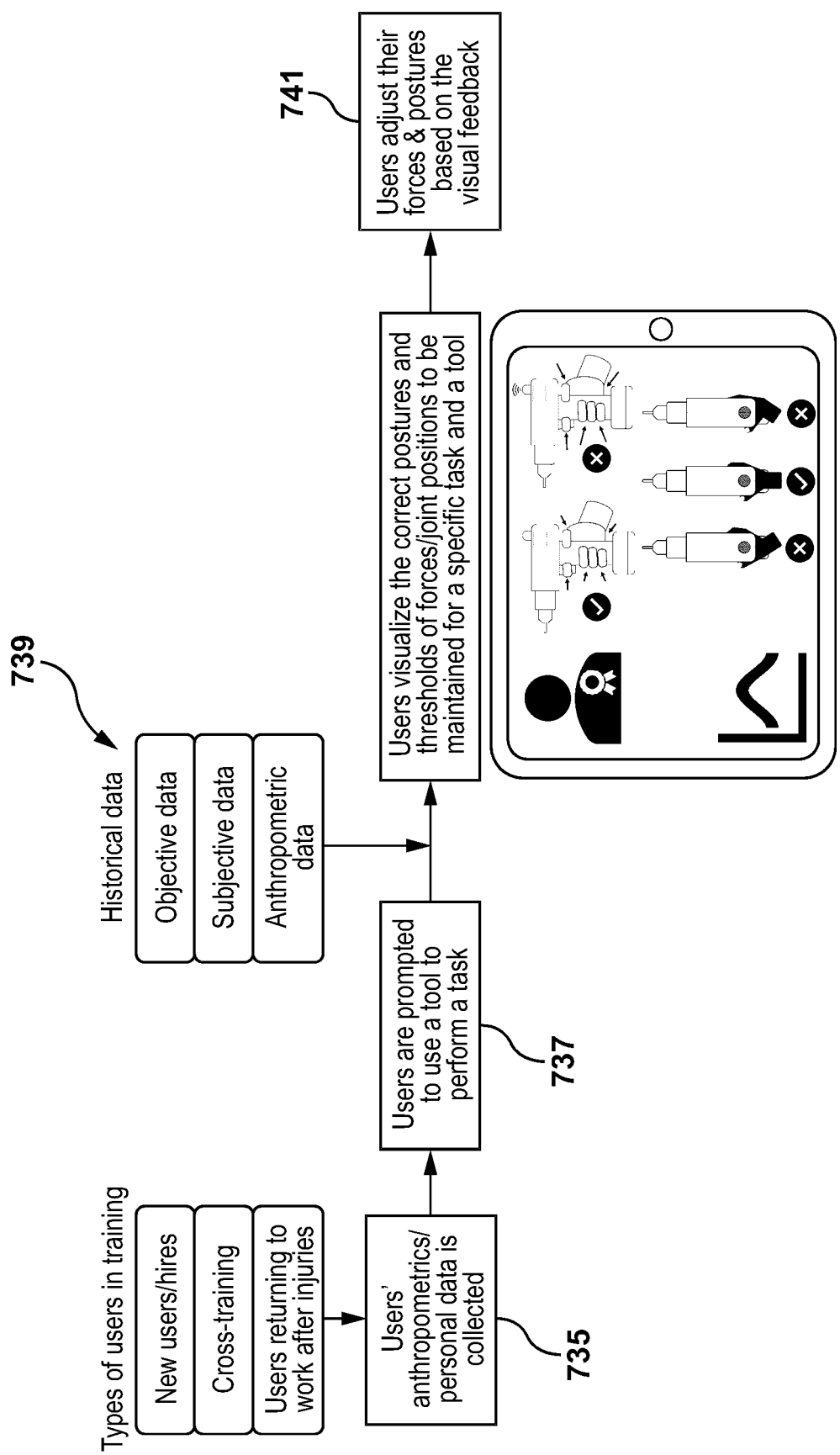
FIG. 11 is a schematic diagram illustrating another embodiment of the method of the invention.
Figure 12:
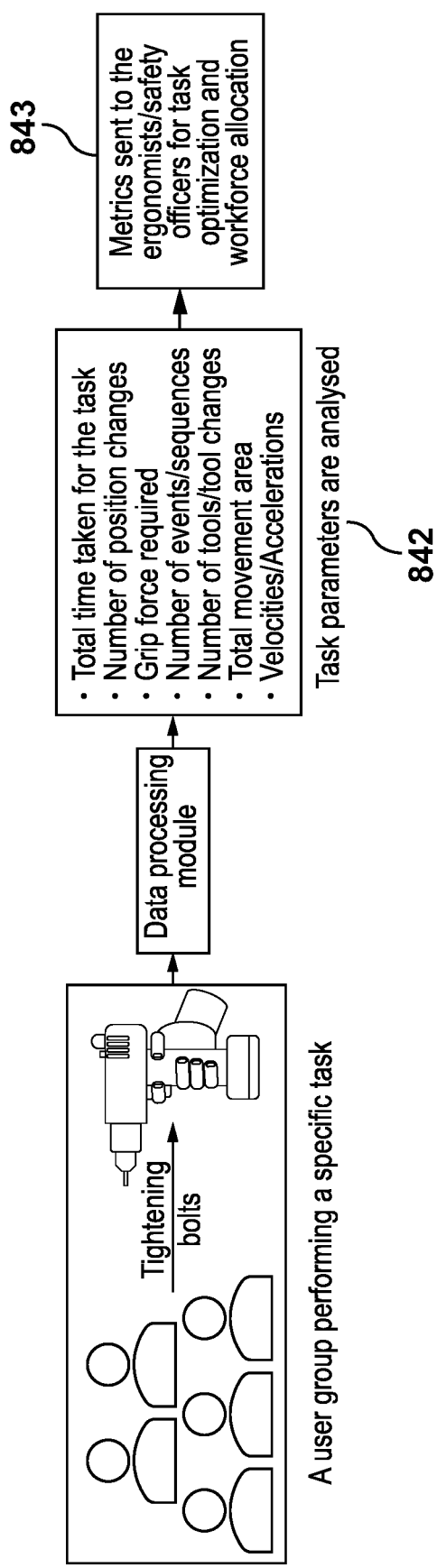
FIG. 12 is a schematic diagram illustrating another embodiment of the method of the invention.

In FIG. 10, the system 20 addresses situations in which the user is injured (step 623a), or the user reports high levels of discomfort and/or fatigue and/or pain (step 623b). The occurrence is flagged and the exposure profile is recorded (step 625). Next, the source of the problem is identified, i.e., the primary exposure metric involved is identified (step 627). The system's database is searched for users with similar exposure profiles (step 629). With this information, the safety officer/ergonomist is instructed to take such steps as are necessary (step 633).

Within limits, it is believed that data from one individual may be used to predict injury in another. This is based on trends in the data (objective data, subjective data, and anthropometric data), and may be helpful regardless of the differences in occupations. In any event, exposure profiles in one individual within a vertical may apply to others, and this may be utilized to provide early warning of potential health problems, or potential injury.

Apart from the need to improve worker health and safety, this may be helpful to the employer, because it enable the employer to demonstrate (e.g., to a workers' compensation board, or an insurance company) that the employer is ensuring that the previously injured user is working safely. The employer also may be able to incur lower insurance costs because of the use of exposure monitoring devices.

It will be understood that the data accumulated by the system 20 may be used to assist in training. First, the personal and other data of the trainee users is collected (step 735). Next, the trainee users are prompted to use a tool to perform a task (step 737). The historical data, and subjective data, are utilized to inform the trainee users as to correct postures and thresholds (step 739). Subsequently, in operating the tool, the trainee user adjusts forces and postures based on feedback (step 741).

The system 20 may also be used to assist in task optimization and workforce allocation. For instance, for a group of users performing a specific task, the data produced thereby is processed to determine a number of task parameters (step 842). The metrics are then sent to the safety officer/ergonomist for task optimization and workforce allocation (step 843).

Task optimization is believed to be important to ensure that the tasks and the preselected acceptable ranges associated with them are realistic, and sustainable. A task may be designed assuming that it can be performed under ideal conditions, or the task may be based on assumptions about the user's physical capabilities that are not always correct. Tracking data such as time to complete the task, number of tool touch points, total movements, and similar data can show whether the task as designed is optimal. The force and position data that is collected may indicate how the task parameters may be changed for an individual user, to improve that user's overall comfort and performance. Alternatively, the data may indicate that a tool should be modified for an individual user, to improve that user's comfort and performance.

It will be appreciated by those skilled in the art that the invention can take many forms, and that such forms are within the scope of the invention as claimed. The scope of the description should not be limited by the preferred embodiments set forth in the examples, but should be given the broadest interpretation consistent with the description as a whole.

We claim:

1. A method of providing cueing signals to a user of a tool (24) having a drive portion (31) defining a drive axis (46) and a handle portion (32) to be held by a selected hand of the user, the method comprising the steps of:
   (a) positioning at least one first position sensor (26) on the forearm (FA) of the user-connected with the selected hand, said at least one first position sensor (26) being configured to provide body portion data for determining one or more body portion positions of a central plane of the forearm (FA);
   (b) positioning at least one second position sensor (28) on the drive axis (46), said at least one second position sensor being configured to provide object data for determining one or more object positions of the drive axis (46);
   (c) providing a processor (30);
   (d) transmitting the body portion data and the object data to the processor;
   (e) with the processor, processing the body portion data and the object data to provide engagement data indicating whether the drive axis is within a preselected acceptable range of positions in relation to alignment thereof with the central plane of the forearm;
   (f) providing an alert device;
   (g) if the processor determines that the drive axis is not within the preselected acceptable range of positions in relation to alignment thereof with the central plane of the forearm, with the processor, transmitting an alert signal to the alert device, and with the alert device, upon receipt of the alert signal, generating a cueing alert signal to indicate that the drive axis is not within the preselected acceptable range of positions; and
   (h) if the processor determines that the drive axis is within the preselected acceptable range of positions in relation to alignment thereof with the central plane of the forearm, transmitting a non-alert signal to the alert device, and with the alert device, upon receipt of the non-alert signal, generating a cueing confirmation signal to indicate that the drive axis is within the preselected acceptable range of positions.

2. A method according to claim 1 in which:
   the preselected acceptable range of positions of the drive axis relative to the central plane of the forearm is amended to take historical data for the user into account to provide a calibrated preselected acceptable engagement data range;
   with the processor, the engagement data is compared to the calibrated preselected acceptable engagement data range;
   if the processor determines that the engagement data is outside the calibrated preselected acceptable engagement data range, with the processor, transmitting the alert signal to the alert device, and with the alert device, upon receipt of the alert signal, generating the cueing alert signal to indicate that the engagement data is outside the calibrated preselected acceptable engagement data range; and
   if the processor determines that the engagement data is within the calibrated preselected acceptable engagement data range, with the processor, transmitting the non-alert signal to the to the alert device, and with the alert device, upon receipt of the non-alert signal, generating the cueing confirmation signal to indicate that the engagement data is within the calibrated preselected acceptable engagement data range.

3. The method according to claim 1 in which the drive axis is within the preselected acceptable range of positions relative to the central plane of the forearm when the drive axis is aligned with the central plane of the forearm.

4. The method of claim 1 in which the drive axis is within the preselected acceptable range of positions in relation to the central plane of the forearm when the drive axis deviates from alignment with the central plane of the forearm by up to 5°.

5. A method of providing cueing signals to a user of a tool (24) having a drive portion (31) defining a drive axis (46) thereof and a hand portion (32) to be held by a selected hand of the user, the method comprising the steps of:
   (a) positioning at least one tool position sensor (28) on the drive axis (46), for providing tool position data regarding a tool position of the drive axis;
   (b) positioning at least one body position sensor (26) on a forearm (FA) of the user connected with the selected hand, for sensing a position of a central plane of the forearm to provide body portion position data regarding a body portion position of the central plane of the forearm;
   (c) providing a processor;
   (d) transmitting the tool position data and the body portion position data to the processor;
   (e) with the processor, comparing the tool position of the drive axis to the body portion position of the central plane of the forearm to determine whether the drive axis is within a preselected acceptable range of tool positions of the drive axis in relation to a parallel position thereof that is parallel to the central plane of the forearm;
   (f) providing an alert device;
   (g) if the processor determines that the tool position of the drive axis is outside the preselected acceptable range of tool positions of the drive axis relative to the body portion position of the central plane of the forearm, with the processor, transmitting a tool error signal to the alert device, and with the alert device, upon receipt by the alert device of the tool error signal, generating a tool cueing alert signal to indicate that the tool position of the drive axis is outside the preselected acceptable range of tool positions of the drive axis relative to the body portion position of the central plane of the forearm; and
   (h) if the processor determines that the tool position of the drive axis is within the preselected range of tool positions of the drive axis relative to the body portion position of the central plane of the forearm, with the processor, transmitting a tool position compliance signal to the alert device, and with the alert device, upon receipt by the alert device of the tool position compliance signal, generating a tool position confirmation signal to indicate that the tool position of the drive axis is within the preselected acceptable range of tool positions of the drive axis relative to the body portion position of the central plane of the forearm.

6. The method according to claim 5 in which the drive axis is within the preselected acceptable range of tool positions thereof when the drive axis is parallel to the central plane of the forearm.

7. The method according to claim 5 in which the drive axis is within the preselected acceptable range of tool positions thereof when the drive axis deviates from parallelism with the central plane of the forearm by up to 5°.

8. The method according to claim 5 in which the tool position data and the body portion position data for the user over time is stored for use in identifying recurring issues in inappropriate positioning.

9. The method according to claim 5 in which the tool position data and the body portion position data for a group that includes the user is aggregated over time to determine common or chronic issues among the group.

10. The method according to claim 5 in which:
a third position sensor (56) is located on a center line (54) of a back (47) of the selected hand (H) of the user;
said at least one body position sensor (26) is positioned on a center line (55) of the forearm;
the processor determines whether the third position sensor (56) on the hand (H) is positioned within a preselected range of acceptable hand positions relative to said at least one body position sensor (26) on the forearm (FA);
if the processor determines that the hand position is outside the preselected acceptable range of hand positions relative to the forearm, with the processor, transmitting an error signal to the alert device, and with the alert device, upon receipt by the alert device of the error signal, generating a cueing alert signal to indicate that the hand position is outside the preselected acceptable range of hand positions relative to the center line of the forearm; and
if the processor determines that the hand position is within the preselected range of hand positions therefor, with the processor, transmitting a hand position compliance signal to the alert device, and with the alert device, upon receipt by the alert device of the hand position compliance signal, generating a hand position confirmation signal to indicate that the hand position is within the preselected acceptable range of hand positions relative to the center line of the forearm.

* * * * *